United States Patent
Park et al.

(10) Patent No.: US 11,858,531 B2
(45) Date of Patent: Jan. 2, 2024

(54) METHOD, DEVICE, AND COMPUTER PROGRAM FOR CONTROLLING STOP OF AUTONOMOUS VEHICLE USING SPEED PROFILE

(71) Applicant: RideFlux Inc., Jeju-si (KR)

(72) Inventors: Junghee Park, Jeju-si (KR); Sungpil Yang, Incheon (KR); Hyunjung Cho, Jeju-si (KR); Deokhwa Han, Seoul (KR); Ho Yun, Jeju-si (KR); Hawook Jeong, Jeju-si (KR)

(73) Assignee: RideFlux Inc., Jeju-si (KR)

( * ) Notice: Subject to any disclaimer, the term of this patent is extended or adjusted under 35 U.S.C. 154(b) by 126 days.

(21) Appl. No.: 17/468,357

(22) Filed: Sep. 7, 2021

(65) Prior Publication Data

US 2022/0073099 A1 Mar. 10, 2022

(30) Foreign Application Priority Data

Sep. 7, 2020 (KR) .................. 10-2020-0114180

(51) Int. Cl.
*B60W 60/00* (2020.01)
*B60W 30/14* (2006.01)
*B60W 30/18* (2012.01)

(52) U.S. Cl.
CPC ...... *B60W 60/0011* (2020.02); *B60W 30/146* (2013.01); *B60W 30/181* (2013.01); *B60W 2520/105* (2013.01)

(58) Field of Classification Search
None
See application file for complete search history.

(56) References Cited

U.S. PATENT DOCUMENTS 9,932,038 B1 * 4/2018 Zhu ............... B60W 40/105
2015/0367845 A1 * 12/2015 Sannodo ............ B60W 10/20
701/23

(Continued)

FOREIGN PATENT DOCUMENTS

JP 2007-263666 A 10/2007
JP 2019-106049 A 6/2019

(Continued)

OTHER PUBLICATIONS

A Notice of Allowance mailed by the Korean Intellectual Property Office dated Mar. 24, 2023, which corresponds to Korean Patent Application No. 10-2022-0183105 and is related to U.S. Appl. No. 17/468,357.

(Continued)

*Primary Examiner* — Ryan Rink
(74) *Attorney, Agent, or Firm* — Studebaker & Brackett PC

(57) ABSTRACT

Provided are a method, a device, and a computer program for controlling stop of an autonomous vehicle using a speed profile. The method of controlling, by a computing device, stop of an autonomous vehicle using a speed profile includes obtaining surrounding information of an autonomous vehicle, determining candidate routes for controlling stop of the autonomous vehicle on the basis of the surrounding information, calculating scores for candidate driving plans for the autonomous vehicle to travel the determined candidate routes according to a preset speed profile, and finalizing a driving plan for the autonomous vehicle on the basis of the calculated scores.

15 Claims, 9 Drawing Sheets

(56) References Cited

U.S. PATENT DOCUMENTS

| | | | |
|---|---|---|---|
| 2016/0016566 A1* | 1/2016 | Kumar | B60T 17/228 |
| | | | 701/70 |
| 2017/0320500 A1* | 11/2017 | Yoo | B60W 30/18163 |
| 2018/0208199 A1* | 7/2018 | Fujita | B60W 60/0016 |
| 2018/0218601 A1* | 8/2018 | Aoki | G08G 1/096827 |
| 2019/0004522 A1* | 1/2019 | Zych | G06Q 10/06315 |
| 2019/0235499 A1* | 8/2019 | Kazemi | G01S 17/931 |
| 2019/0317512 A1* | 10/2019 | Zhang | G05D 1/0238 |
| 2020/0117199 A1* | 4/2020 | Akella | G08G 1/166 |
| 2020/0285235 A1* | 9/2020 | Yamane | B60W 10/20 |
| 2021/0271245 A1* | 9/2021 | Bradley | G05D 1/0088 |
| 2023/0099853 A1* | 3/2023 | Mangas | B60W 50/0097 |
| | | | 701/23 |

FOREIGN PATENT DOCUMENTS

| | | |
|---|---|---|
| KR | 10-2016-0056711 A | 5/2016 |
| KR | 10-1795250 B1 | 11/2017 |
| KR | 10-2018-088633 A | 8/2018 |

OTHER PUBLICATIONS

An Office Action mailed by the Korean Intellectual Property Office dated Nov. 4, 2021, which corresponds to Korean Patent Application No. 10-2020-0114180 and is related to U.S. Appl. No. 17/468,357.

* cited by examiner

METHOD, DEVICE, AND COMPUTER PROGRAM FOR CONTROLLING STOP OF AUTONOMOUS VEHICLE USING SPEED PROFILE

CROSS-REFERENCE TO RELATED APPLICATION

This application claims priority to and the benefit of Korean Patent Application No. 2020-0114180, filed on Sep. 7, 2020, the disclosure of which is incorporated herein by reference in its entirety.

BACKGROUND

1. Field of the Invention

The present invention relates to a method, a device, and a computer program for controlling stop of an autonomous vehicle using a speed profile.

2. Discussion of Related Art

For convenience of users who drive vehicles, various sensors, electronic devices, etc. (e.g., an advance driver assistance system (ADAS)) are being provided. In particular, technologies are under active development for an autonomous driving system which recognizes surroundings without a driver's intervention and automatically travels to a given destination according to the recognized surroundings.

Here, the autonomous driving system refers to a vehicle which recognizes surroundings without a driver's intervention and automatically travels to a given destination according to the recognized surroundings.

Existing autonomous driving systems learn data about road conditions, travel routes, etc. and control vehicles to travel to destinations using the learned data.

However, such existing autonomous driving systems control stop of autonomous vehicles in consideration of the prevention of only an event such as collision with an object (e.g., another vehicle, a person, or an obstacle). Accordingly, it is not possible to prevent an autonomous vehicle from stopping at an inappropriate location (e.g., on a crosswalk, in a no-stopping or parking zone, at a crossroad, and close to a fire hydrant).

Also, when the existing autonomous driving systems control stop of autonomous vehicles, the autonomous driving systems determine to stop autonomous vehicles and stop the autonomous vehicles according to a uniform control method (e.g., a control method of slowing an autonomous vehicle down according to a certain acceleration and then stopping the autonomous vehicle). Accordingly, tendencies and characteristics of a driver or passenger in the autonomous vehicle cannot be taken into consideration.

SUMMARY OF THE INVENTION

The present invention is directed to providing a method, a device, and a computer program for controlling stop of an autonomous vehicle using a speed profile, the method, and the device, and the computer program determining a location for the autonomous vehicle to stop in consideration of surrounding information of the autonomous vehicle, in other words, determining an optimal location for the autonomous vehicle to stop by calculating scores for a plurality of candidate routes and candidate stop locations of the plurality of candidate routes using a plurality of preset speed profiles and determining a location for the autonomous vehicle to stop on the basis of the calculated scores.

Objects of the present invention are not limited to that described above, and other objects which have not been described above may be clearly understood by those of ordinary skill in the art from the following descriptions.

According to an aspect of the present invention, there is provided a method of controlling, by a computing device, stop of an autonomous vehicle using a speed profile, the method including obtaining surrounding information of an autonomous vehicle, determining candidate routes for controlling stop of the autonomous vehicle on the basis of the surrounding information, calculating scores for candidate driving plans for the autonomous vehicle to travel the determined candidate routes according to a preset speed profile, and finalizing a driving plan for the autonomous vehicle on the basis of the calculated scores.

The method may further include determining candidate stop locations on the determined candidate routes, the determining of the candidate stop locations may include determining, as the candidate stop location, at least one of a location which is spaced a certain distance from a stop line on the determined candidate route, a location which is spaced a certain distance from a location at which an object present on the determined candidate route has stopped or is predicted to stop, and a location input by a driver or a passenger of the autonomous vehicle, the calculating of the scores may include calculating scores for the determined candidate stop locations and the candidate driving plans including driving methods to the determined candidate stop locations, and the finalizing of the driving plan may include finalizing a route, a stop location, and a driving plan including a driving method to the stop location for the autonomous vehicle on the basis of the calculated score.

The calculating of the scores may include calculating the score for the candidate driving plan for the autonomous vehicle to travel the determined candidate route and then stop at the determined candidate stop location according to a first speed profile by applying the first speed profile to the autonomous vehicle. When a current speed of the autonomous vehicle is $v_0$, a current acceleration is $a_0$, and a distance to the determined candidate stop location is $s_{target}$, the first speed profile may increase or reduce a speed of the autonomous vehicle from $v_0$ to a preset target speed of $v_{target}$ using the current acceleration of $a_0$ and a preset sectional acceleration profile, may maintain the speed of the autonomous vehicle at $v_{target}$ for a certain period from a time point at which the speed of the autonomous vehicle becomes $v_{target}$, and may reduce the speed of the autonomous vehicle from $v_{target}$ to zero using the preset sectional acceleration profile and stop the autonomous vehicle at the determined candidate stop location after the certain period. The certain period may be set such that a distance traveled by the autonomous vehicle according to the first speed profile becomes $s_{target}$.

The calculating of the scores may include calculating the score for the candidate driving plan for the autonomous vehicle to travel the determined candidate route and then stop at the determined candidate stop location according to a second speed profile by applying the second speed profile to the autonomous vehicle. When a current speed of the autonomous vehicle is $v_0$, a current acceleration is $a_0$, and a distance to the determined candidate stop location is $s_{target}$, the second speed profile may increase or reduce a speed of the autonomous vehicle from $v_0$ to a preset target speed of $v_{target}$ using the current acceleration of $a_0$ and a preset sectional acceleration profile, may maintain the speed of the autonomous vehicle at $v_{target}$ for a first period from a time point at which the speed of the autonomous vehicle becomes $v_{target}$, may reduce the speed of the autonomous vehicle from $v_{target}$ to $v_{tail}$ using the preset sectional acceleration profile after the first period, may maintain the speed of the autonomous vehicle at $v_{tail}$ for a second period from a time at which the speed of the autonomous vehicle becomes $v_{tail}$, and may reduce the speed of the autonomous vehicle from $v_{tail}$ to zero using the preset sectional acceleration profile and stop the autonomous vehicle at the determined candidate stop location after the second period. The first period may be set such that a distance traveled by the autonomous vehicle according to the second speed profile becomes a difference between $s_{target}$ and $s_{tail}$, and the second period may be set such that a distance traveled by the autonomous vehicle according to the second speed profile becomes $s_{tail}$.

The calculating of the scores may include calculating the score for the candidate driving plan for the autonomous vehicle to travel the determined candidate route and then stop at the determined candidate stop location according to a third speed profile by applying the third speed profile to the autonomous vehicle. When a current speed of the autonomous vehicle is $v_0$, a current acceleration of the autonomous vehicle is $a_0$, and a distance to the determined candidate stop location is $s_{target}$, the third speed profile may reduce a speed of the autonomous vehicle from $v_0$ to zero using the current acceleration of $a_0$, a target acceleration of $a_{decel}$ of the autonomous vehicle, and a preset sectional acceleration profile and stop the autonomous vehicle at the determined candidate stop location. $a_{decel}$ may be set to a value such that a distance traveled by the autonomous vehicle according to the third speed profile becomes $s_{target}$.

The calculating of the scores may include calculating the score for the candidate driving plan for the autonomous vehicle to travel the determined candidate route and then stop at the determined candidate stop location according to a fourth speed profile by applying the fourth speed profile to the autonomous vehicle. When a current speed of the autonomous vehicle is $v_0$, a current acceleration is $a_0$, and a distance to the determined candidate stop location is $s_{target}$, the fourth speed profile may reduce a speed of the autonomous vehicle from $v_0$ to $v_{tail}$ using the current acceleration of $a_0$, a target acceleration of $a_{decel}$ of the autonomous vehicle, and a preset sectional acceleration profile, may maintain the speed of the autonomous vehicle at $v_{tail}$ for a certain period from a time point at which the speed of the autonomous vehicle becomes $v_{tail}$, and may reduce the speed of the autonomous vehicle from $v_{tail}$ to zero using the preset sectional acceleration profile and stop the autonomous vehicle at the determined candidate stop location after the certain period. The certain period may be set such that a distance traveled by the autonomous vehicle from the time point at which the speed of the autonomous vehicle becomes $v_{tail}$ becomes a difference value $s_{tail}$ between $s_{target}$ and a distance $s_{travel,ramp}$ traveled by the autonomous vehicle until the speed of the autonomous vehicle reaches $v_{tail}$.

The calculating of the scores may include calculating the score for the candidate driving plan for the autonomous vehicle to travel the determined candidate route according to a fifth speed profile by applying the fifth speed profile to the autonomous vehicle. When a current speed of the autonomous vehicle is $v_0$ and a current acceleration is $a_0$, the fifth speed profile may increase or reduce a speed of the autonomous vehicle from $v_0$ to $v_{target}$ using the current acceleration of $a_0$ and a preset sectional acceleration profile and may cause the autonomous vehicle to travel while maintaining the speed of the autonomous vehicle at $v_{target}$.

The calculating of the scores may include calculating the score for the candidate driving plan for the autonomous vehicle to travel the determined candidate route according to a sixth speed profile by applying the sixth speed profile to the autonomous vehicle. When a current speed of the autonomous vehicle is $v_0$, a current acceleration is $a_0$, and a distance to a location at which a preset target speed of $v_{target}$ of the autonomous vehicle will be achieved is $s_{target}$, the sixth speed profile may increase or reduce a speed of the autonomous vehicle from $v_0$ to $v_{target}$ using the current acceleration of $a_0$, a target acceleration of $a_{adjust}$ of the autonomous vehicle, and a preset sectional acceleration profile and may cause the autonomous vehicle to travel while maintaining the speed of the autonomous vehicle at $v_{target}$. $a_{adjust}$ may be set such that a distance traveled by the autonomous vehicle until the speed of the autonomous vehicle reaches $v_{target}$ becomes $s_{target}$.

The calculating of the scores may include calculating the score for the candidate driving plan for the autonomous vehicle to travel the determined candidate route and stop according to a seventh speed profile by applying the seventh speed profile to the autonomous vehicle. When a current speed of the autonomous vehicle is $v_0$ and a current acceleration is $a_0$, the seventh speed profile may reduce a speed of the autonomous vehicle from $v_0$ to zero and stop the autonomous vehicle using the current acceleration of $a_0$, a target acceleration of $a_{target}$ of the autonomous vehicle, and a preset sectional acceleration profile.

The calculating of the scores may include calculating the score for the candidate driving plan for the autonomous vehicle to travel the determined candidate route and stop according to an eighth speed profile by applying the eighth speed profile to the autonomous vehicle. When a current speed of the autonomous vehicle is $v_0$, the eighth speed profile may reduce a speed of the autonomous vehicle from $v_0$ to zero and stop the autonomous vehicle using a preset acceleration of $a_{emergency}$. $a_{emergency}$ may be a value preset without considering a current acceleration of $a_0$ of the autonomous vehicle and a preset sectional acceleration profile.

The calculating of the scores may include determining whether the determined candidate stop locations correspond to a preset no-stopping zone and correcting the scores calculated for the determined candidate stop locations according to a result of determining whether the determined candidate stop locations correspond to the preset no-stopping zone.

The calculating of the scores may include calculating the scores for the candidate driving plans for traveling the determined candidate routes using a processor included in the computing device. In other words, when there are a plurality of candidate driving plans for which scores will be calculated because there are the plurality of determined candidate routes or a plurality of candidate stop locations are determined on the determined candidate routes, the calculating of the scores may include calculating the scores for the plurality of candidate driving plans for traveling the determined candidate routes using a plurality of different processors, the plurality of candidate driving plans including continuously traveling the plurality of candidate routes without stopping or traveling the plurality of candidate routes and then stopping at any one of the plurality of candidate stop locations determined on the plurality of candidate routes, and the finalizing of the driving plan may include collecting the scores calculated by the plurality of different processors and finalizing the candidate driving plan having the highest score as the driving plan for the autonomous vehicle.

The method may further include receiving a target stop location for the autonomous vehicle from a user, transmitting information on the received target stop location to a server and receiving a control command, which is determined according to scores calculated for the target stop location and a driving plan including a driving method to the target stop location on the basis of the preset speed profile, from the server, and controlling the autonomous vehicle to stop at the target stop location according to the control command.

The method may further include providing guide information of the finalized stop location, and the providing of the guide information may include providing information on the finalized route, the finalized stop location, and the finalized driving plan through a display provided in the autonomous vehicle, providing the information on the finalized route, the finalized stop location, and the finalized driving plan to another vehicle adjacent to the autonomous vehicle through vehicle-to-vehicle communication, or displaying the finalized stop location on a road on which the autonomous vehicle is traveling through a location display module provided in the autonomous vehicle.

According to another aspect of the present invention, there is provided a device for controlling stop of an autonomous vehicle using a speed profile, the device including a processor, a network interface, a memory, and a computer program which is loaded into the memory and executed by the processor. The computer program includes an instruction of obtaining surrounding information of an autonomous vehicle, an instruction of determining candidate routes for controlling stop of the autonomous vehicle on the basis of the surrounding information, an instruction of calculating scores for candidate driving plans for the autonomous vehicle to travel the determined candidate routes according to a preset speed profile, and an instruction of finalizing a driving plan for the autonomous vehicle on the basis of the calculated scores.

According to another aspect of the present invention, there is provided a computer program recorded on a computer-readable recording medium to perform operations of obtaining surrounding information of an autonomous vehicle, determining candidate routes for controlling stop of the autonomous vehicle on the basis of the surrounding information, calculating scores for candidate driving plans for the autonomous vehicle to travel the determined candidate routes according to a preset speed profile, and finalizing a driving plan for the autonomous vehicle on the basis of the calculated scores.

Other details of the present invention are included in the detailed description and drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
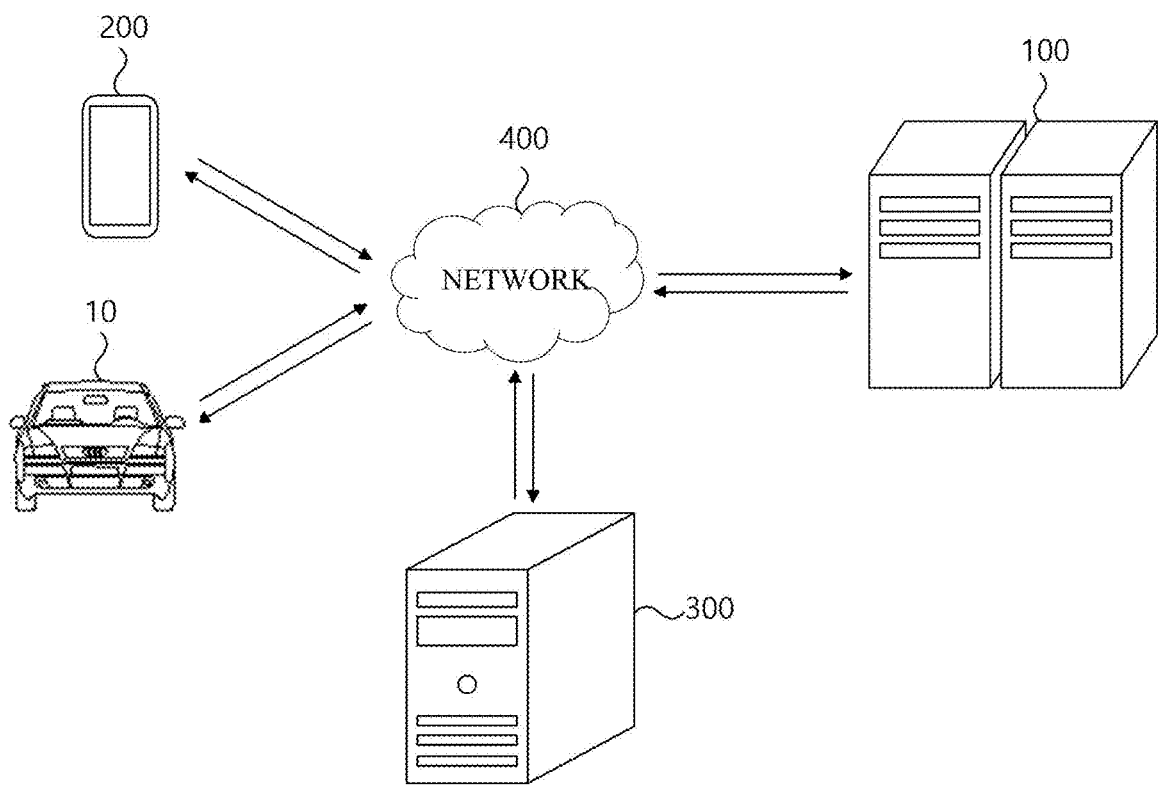
FIG. 1 is a diagram illustrating a system for controlling stop of an autonomous vehicle using a speed profile according to an exemplary embodiment of the present invention.

Advantages and features of the present invention and methods for achieving them will be apparent with reference to embodiments described below in detail with the accompanying drawings. However, the present invention is not limited to the embodiments disclosed below and may be implemented in various forms. Rather, the embodiments are provided so that this disclosure will be thorough and complete and will fully convey the scope of the invention to those skilled in the technical field to which the present invention pertains. The scope of the present invention is only defined by the claims.

The terminology used herein is for the purpose of describing embodiments and is not intended to be limiting. As used herein, the singular forms are intended to include the plural forms as well unless the context clearly indicates otherwise. "Comprises" and/or "comprising" used herein do not preclude the presence or addition of one or more elements other than stated elements. Throughout the specification, like reference numerals refer to like elements, and "and/or" includes any and all combinations of listed elements. Although the terms "first," "second," etc. may be used to describe various elements, these elements are not limited by these terms. These terms are only used to distinguish one element from another. Accordingly, a first element discussed below may be termed a second element within the technical scope of the present invention.

Unless otherwise defined, all terms (including technical and scientific terms) used herein have the same meaning as commonly understood by those skilled in the technical field to which the present invention pertains. Also, terms defined in commonly used dictionaries should not be interpreted in an idealized or overly formal sense unless expressly so defined herein.

The term "unit" or "module" used herein means a software or hardware element, such as a field programmable gate array (FPGA) or an application specific integrated circuit (ASIC), and the "unit" or "module" performs certain roles. However, the "unit" or "module" is not limited to software or hardware. The "unit" or "module" may be configured to be present in an addressable storage medium or configured to run on one or more processors. Therefore, as an example, the "unit" or "module" may include elements, such as software elements, object-oriented software elements, class elements, and task elements, processes, functions, attributes, procedures, subroutines, segments of program code, drivers, firmware, microcode, circuitry, data, databases, data structures, tables, arrays, and variables. Functions provided within elements and the "unit" or "module" may be integrated into a smaller number of elements and "units" or "modules" or separated into additional elements and "units" or "modules."

Spatially-relative terms, such as "below," "beneath," "lower," "above," and "upper," may be used to easily describe relationships of one element with other elements as shown in the drawings. It will be understood that spatially-relative terms are intended to include different orientations of elements in addition to the orientation shown in the drawings. For example, when an element shown in a drawing is turned over, elements described as "below" or "beneath" another element may be oriented "above" the other element. Therefore, the exemplary term "below" or "beneath" may include both orientations of above and below. An element may be oriented in another direction, and thus the spatially-relative terms may be interpreted according to the orientation of the element.

In this specification, a computer means any type of hardware device including at least one processor and may be understood as encompassing a software configuration operating on a corresponding hardware device according to an embodiment. For example, a computer may be understood as including, but not limited to, all of a smartphone, a tablet personal computer (PC), a desktop computer, a laptop computer, and a user client and application running on each of the devices.

This specification describes a method of controlling driving and stopping of an autonomous vehicle which is applied to an autonomous vehicle that autonomously travels and stops without a driver's control. However, this is merely an example, and the method is not limited thereto. The method can be applied to vehicles which do not use autonomous driving functions or to which autonomous driving functions are not applied and used in fields of assisting a driver with driving and stopping control.

Hereinafter, exemplary embodiments of the present invention will be described in detail with reference to the accompanying drawings.

Although each operation is described herein as being performed by a computer, a subject of each operation is not limited thereto, and at least some of operations may be performed by different devices according to an embodiment.

FIG. 1 is a diagram illustrating a system for controlling stop of an autonomous vehicle using a speed profile according to an exemplary embodiment of the present invention.

Referring to FIG. 1, the system for controlling stop of an autonomous vehicle using a speed profile according to the exemplary embodiment of the present invention may include a device (or server) 100 for controlling stop of an autonomous vehicle, a user terminal 200, and an external server 300.

Here, the system for controlling stop of an autonomous vehicle using a speed profile shown in FIG. 1 is in accordance with the exemplary embodiment, and elements of the system are not limited to the exemplary embodiment shown in FIG. 1 and may be added, changed, or removed as necessary.

In the exemplary embodiment, the device 100 for controlling stop of an autonomous vehicle may be connected to an autonomous vehicle 10 or a control module of the autonomous vehicle through a network 400 and control traveling and stopping of the autonomous vehicle 10. For example, the device 100 for controlling stop of an autonomous vehicle may be provided in the autonomous vehicle 10. The device 100 for controlling stop of an autonomous vehicle may collect surrounding information of the autonomous vehicle 10 from a sensor module which acquires various pieces of information about the inside and outside of the autonomous vehicle 10, determine a control command for the autonomous vehicle 10 on the basis of the collected surrounding information, and transmit the determined control command to the control module in the autonomous vehicle 10 such that the control module may control the autonomous vehicle 10.

Here, the surrounding information of the autonomous vehicle 10 may include external information including the topography surrounding the autonomous vehicle 10, road signs, traffic lights, signal information output by the traffic lights, whether there is an object (e.g., another vehicle, a pedestrian, or an obstacle) adjacent to the autonomous vehicle 10, and a location, a posture, and a trajectory of the object and internal information including a current location, posture, speed, and acceleration of the autonomous vehicle 10. However, the surrounding information of the autonomous vehicle 10 is not limited thereto and may further include various pieces of information which are available for determining the control command for the autonomous vehicle 10.

In various embodiments, when controlling stop of the autonomous vehicle 10, the device 100 for controlling stop of an autonomous vehicle may determine one or more candidate routes for controlling stop of the autonomous vehicle 10 on the basis of the surrounding information and determine one or more candidate stop locations for each of the one or more candidate routes.

Subsequently, the device 100 for controlling stop of an autonomous vehicle may calculate scores for candidate driving plans for the autonomous vehicle 10 to travel the one or more candidate routes according to a preset speed profile, finalize a driving plan for the autonomous vehicle 10 on the basis of the calculated scores, and determine a control command so that the autonomous vehicle 10 travels (e.g., starts and stops) according to the finalized driving plan.

Here, the candidate driving plans may be for the autonomous vehicle 10 to travel a specific candidate route or travel a specific candidate route and then stop at a candidate stop location on the specific candidate route according to a preset speed profile. However, the candidate driving plans are not limited thereto.

In the exemplary embodiment, the user terminal 200 (e.g., a terminal of a driver or passenger of the autonomous vehicle 10) may be connected to the device 100 for controlling stop of an autonomous vehicle through the network 400 and may receive various pieces of information which are generated when the device 100 for controlling stop of an autonomous vehicle performs a method of controlling stop of the autonomous vehicle 10 using a speed profile.

In various embodiments, the user terminal 200 may include, but not limited to, at least one of a personal computer (PC), a mobile phone, a smart phone, a tablet PC, a notebook computer, a personal digital assistant (PDA), a potable multimedia player (PMP), a ultra-mobile PC (UMPC), and a vehicle infotainment system, which have a display in at least a part thereof.

In the exemplary embodiment, the external server 300 may be connected to the device 100 for controlling stop of an autonomous vehicle through the network 400 and may store and manage various pieces of information (e.g., surrounding information), data (e.g., speed profile data and sectional acceleration profile data), and software (e.g., candidate route determination software, candidate stop location determination software, and score calculation software) required for the device 100 for controlling stop of an autonomous vehicle to perform the method of controlling stop of the autonomous vehicle 10 using a speed profile. For example, the external server 300 may be a storage server which is separately provided outside the device 100 for controlling stop of an autonomous vehicle.

In the system for controlling stop of an autonomous vehicle using a speed profile according to the exemplary embodiment of the present invention, various pieces of information, data, and software required for the device 100 for controlling stop of an autonomous vehicle to perform the method of controlling stop of the autonomous vehicle 10 using a speed profile are stored in the external server 300, but the system for controlling stop of an autonomous vehicle is not limited thereto. The device 100 for controlling stop of an autonomous vehicle may include a storage device therein and store various pieces of information, data, and software required for performing the method of controlling stop of the autonomous vehicle 10 using a speed profile in the internal storage device. A hardware configuration of the device 100 for controlling stop of an autonomous vehicle which may perform the method of controlling stop of the autonomous vehicle 10 using a speed profile will be described below with reference to FIG. 2.

Figure 2:
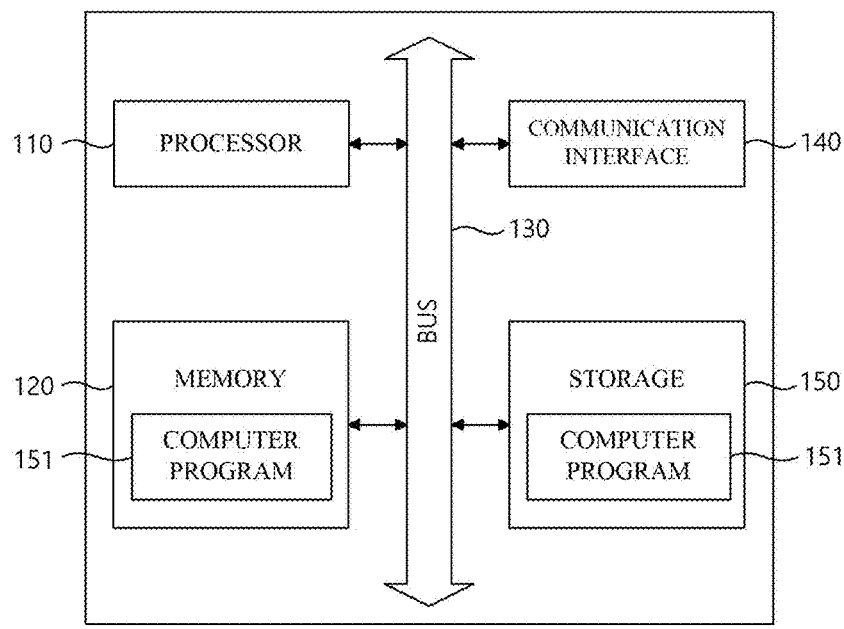
FIG. 2 is a block diagram illustrating a hardware configuration of a device for controlling stop of an autonomous vehicle using a speed profile according to another exemplary embodiment of the present invention.

FIG. 2 is a block diagram illustrating a hardware configuration of a device for controlling stop of an autonomous vehicle using a speed profile according to another exemplary embodiment of the present invention.

Referring to FIG. 2, a device 100 for controlling stop of an autonomous vehicle (hereinafter, a "computing device 100") according to another exemplary embodiment of the present invention may include at least one processor 110, a memory 120 in which a computer program 151 executed by the processor 110 is loaded, a bus 130, a communication interface 140, and a storage 150 which stores the computer program 151. In FIG. 2, only elements related to the exemplary embodiment of the present invention are shown. Accordingly, those skilled in the technical field to which the present invention pertains may understand that general-purpose elements other than those shown in FIG. 2 may be further included.

The processor 110 controls overall operations of the elements of the computing device 100. The processor 110 may include a central processing unit (CPU), a microprocessor unit (MPU), a microcontroller unit (MCU), a graphics processing unit (GPU), or any type of processor well known in the technical field of the present invention.

Also, the processor 110 may perform computation for at least one application or program for performing a method according to exemplary embodiments of the present invention, and the computing device 100 may include at least one processor.

In various exemplary embodiments, the processor 110 may include a random access memory (RAM) (not shown) and a read-only memory (ROM) which temporarily or permanently store signals (or data) processed in the processor 110. Also, the processor 110 may be implemented in the form of a system on chip (SoC) including at least one of a graphics processor, a RAM, and a ROM.

The memory 120 stores various pieces of data, commands, and/or information. The memory 120 may load the computer program 151 from the storage 150 to perform a method/operation according to various exemplary embodiments of the present invention. When the computer program 151 is loaded in the memory 120, the processor 110 may perform the method/operation by executing one or more instructions constituting the computer program 151. The memory 120 may be implemented as a non-volatile memory such as a RAM, but the technical scope of the present invention is not limited thereto.

The bus 130 provides a communication function between the elements of the computing device 100. The bus 130 may be implemented in various forms such as an address bus, a data bus, and a control bus.

The communication interface 140 supports wired and wireless Internet communication of the computing device 100. Also, the communication interface 140 may support various communication methods in addition to Internet communication. To this end, the communication interface 140 may include a communication module well known in the technical field of the present invention. In some embodiments, the communication interface 140 may be omitted.

The storage 150 may non-temporarily store the computer program 151. When the process of controlling stop of an autonomous vehicle is performed by the computing device 100, the storage 150 may store various pieces of information (e.g., surrounding information of the autonomous vehicle 10, a plurality of preset speed profiles, and a preset sectional acceleration profile) required for performing the method of controlling stop of the autonomous vehicle 10 using a speed profile.

The storage 150 may include a non-volatile memory, such as a ROM, an erasable programmable ROM (EPROM), an electrically erasable programmable ROM (EEPROM), and a flash memory, a hard disk, a detachable disk, or any form of computer-readable recording medium well known in the technical field of the present invention.

The computer program 151 may include one or more instructions which cause the processor 110 to perform a method/operation according to various exemplary embodiments of the present invention when loaded in the memory 120. In other words, the processor 110 may perform the method/operation according to various exemplary embodiments of the present invention by executing the one or more instructions.

In the exemplary embodiment, the computer program 151 may include one or more instructions for performing the method of controlling stop of an autonomous vehicle using a speed profile, the method including an operation of obtaining surrounding information of an autonomous vehicle, an operation of determining candidate routes for controlling stop of the autonomous vehicle on the basis of the surrounding information, an operation of calculating scores for candidate driving plans for the autonomous vehicle to travel the determined candidate routes according to a preset speed profile, and an operation of finalizing a driving plan for the autonomous vehicle on the basis of the calculated scores.

Operations of a method or algorithm described in connection with an exemplary embodiment of the present invention may be directly implemented as hardware, implemented as a software module executed by hardware, or implemented as a combination thereof. The software module may be stored in a RAM, a ROM, an EPROM, an EEPROM, a flash memory, a hard disk, a detachable disk, a compact disc (CD)-ROM, or any type of computer-readable recording medium well known in the technical field of the present invention.

Elements of the present invention may be implemented as a program (or an application) and stored in a medium so as to be executed in combination with a computer which is hardware. Elements of the present invention may be executed through software programming or software elements. Similarly, an exemplary embodiment may be implemented with a programming or scripting language, such as C, C++, Java, or assembler, to include various algorithms implemented with a combination of data structures, processes, routines, or other programming elements. Functional aspects may be implemented in an algorithm which is executed by one or more processors. A method of controlling, by the computing device 100, stop of the autonomous vehicle 10 using a speed profile will be described below with reference to FIGS. 3 to 14.

Figure 3:
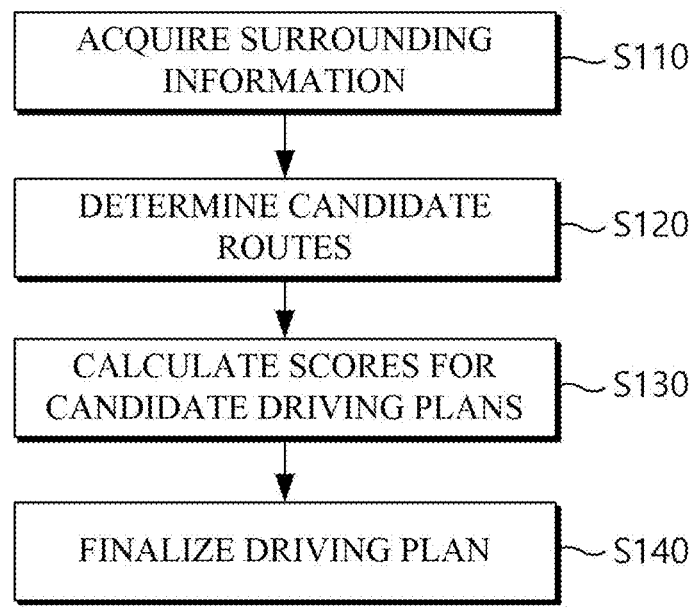
FIG. 3 is a flowchart illustrating a method of controlling stop of an autonomous vehicle using a speed profile according to still another exemplary embodiment of the present invention.

FIG. 3 is a flowchart illustrating a method of controlling stop of an autonomous vehicle using a speed profile according to still another exemplary embodiment of the present invention.

Referring to FIG. 3, in operation S110, the computing device 100 may obtain surrounding information of the autonomous vehicle 10. For example, the computing device 100 may collect surrounding information of the autonomous vehicle 10 from the autonomous vehicle 10 or a sensor module (e.g., a module including various sensors such as a laser sensor, a light detection and ranging (LiDAR) sensor, a camera sensor, and a location sensor) provided in the user terminal 200 of a user who is in the autonomous vehicle 10.

Here, the surrounding information may include external information including the topography surrounding the autonomous vehicle 10, road signs (e.g., arrows denoting going straight, turning left, turning right, going straight and then turning left, going straight and then turning right, and no going straight, child protection zone, crosswalk), traffic lights, signal information output by the traffic lights, whether there is an object (e.g., another vehicle, a pedestrian, or an obstacle) adjacent to the autonomous vehicle 10, and a location, a posture, and a trajectory of the object and internal information including a current location, posture, speed, and acceleration of the autonomous vehicle 10.

In various embodiments, the computing device 100 may collect location information of the autonomous vehicle 10 from the autonomous vehicle 10 or the user terminal 20 of the user who is in the autonomous vehicle 10 and collect surrounding information of the autonomous vehicle 10 acquired by a sensor module (e.g., a closed circuit television (CCTV) camera) provided in an area in which the autonomous vehicle 10 is present on the basis of the collected location information of the autonomous vehicle 10. However, a method of collecting surrounding information is not limited thereto, and various methods may be used to collect surrounding information of the autonomous vehicle 10.

In operation S120, the computing device 100 may determine a candidate route for controlling stop of the autonomous vehicle 10 on the basis of the surrounding information of the autonomous vehicle 10 obtained from the autonomous vehicle 10 or the user terminal 200.

Figure 4A:
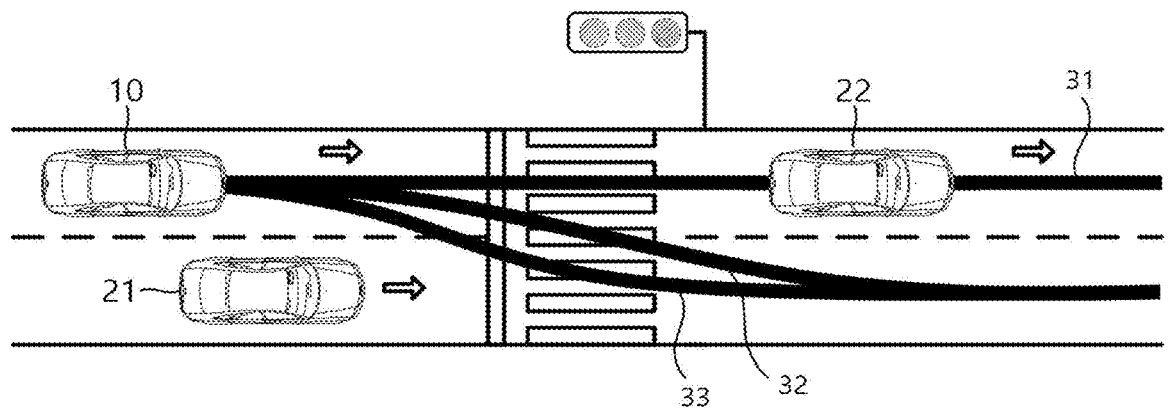
FIG. 4A and FIG. 4B are a set of diagrams exemplifying candidate routes and candidate stop locations which may be applied to various embodiments.

In various embodiments, the computing device 100 may determine all cases in which the autonomous vehicle 10 may move and travel as candidate routes on the basis of the surrounding information of the autonomous vehicle 10. The computing device 100 may determine a plurality of candidate routes for the autonomous vehicle 10. For example, as shown in FIG. 4A, when the autonomous vehicle 10 is traveling in a first lane on a road including two lanes, the computing device 100 may determine a candidate route (first candidate route) 31 for continuously traveling in the first lane which is a current lane and candidate routes (second candidate route and third candidate route) 32 and 33 for changing the current lane to the second lane and traveling in the second lane.

Also, when there is another vehicle 21 adjacent to the autonomous vehicle 10, the computing device 100 may subdivide the candidate routes 32 and 33 for changing the current lane to the second lane and traveling in the second lane into the candidate route (second candidate route) 32 for changing the lanes and traveling before the other vehicle 21 passes by and the candidate route (third candidate route) 33 for changing the lanes and traveling after the other vehicle 21 passes by. However, this is only one example of determining a candidate route. A method of determining a candidate route for the autonomous vehicle 10 is not limited thereto, and various methods may be used to determine a candidate route for the autonomous vehicle 10.

In various embodiments, the computing device 100 may determine a candidate stop location on each of one or more candidate routes determined for the autonomous vehicle 10 to apply a preset speed profile (e.g., a first speed profile, a second speed profile, a third speed profile, a fourth speed profile, a seventh speed profile, and an eighth speed profile) to each of the candidate routes.

In various embodiments, as a candidate stop location, the computing device 100 may determine at least one of a location which is spaced a certain distance from a stop line (e.g., a stop line in front of an intersection or a stop line in front of a crosswalk) on the candidate route determined for the autonomous vehicle 10, a location which is spaced a certain distance from a location at which an object (e.g., another vehicle, a pedestrian, or an obstacle) has stopped or is predicted to stop on the determined candidate route, and a location input by a driver or a passenger of the autonomous vehicle 10.

Here, the computing device 100 may determine a location which is spaced a certain distance from a stop line as a candidate stop location regardless of a signal output by traffic lights adjacent to the stop line, and the candidate stop location indicating the location spaced the certain distance from the stop line may be determined as a candidate location for all the candidate routes.

Figure 4B:
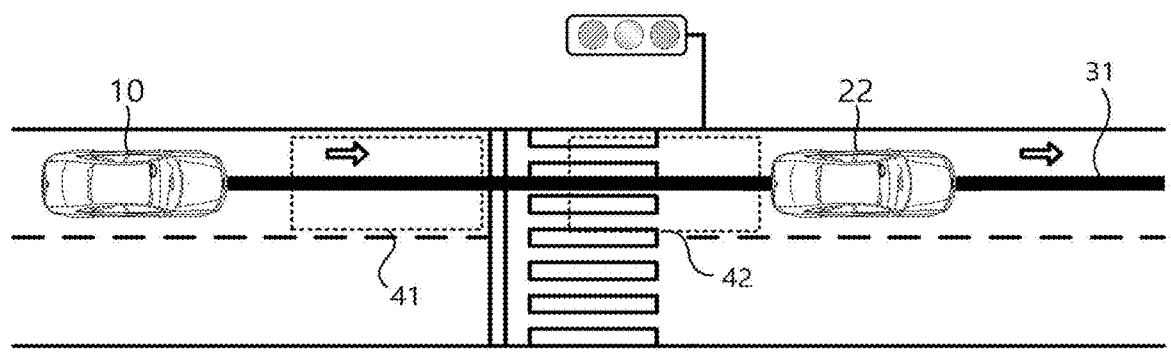

For example, as shown in FIG. 4B, the computing device 100 may determine a location which is spaced a certain distance from a stop line as a first candidate stop location 41 on a first candidate route 31 for continuously traveling in the first lane which is a current lane and determine a location spaced the certain distance from a location at which another vehicle 22 in front of the autonomous vehicle 10 has stopped or is predicted to stop on the first candidate route 31 as a second candidate stop location 42. Also, the computing device 100 may determine a location wanted by the driver or passenger of the autonomous vehicle 10 on the first candidate route 31 as a third candidate stop location for the first candidate route 31.

Although not shown in FIG. 4B, the computing device 100 may determine a location which is spaced a certain distance from the stop line as a first candidate stop location for a second candidate route for changing lanes and traveling before another vehicle passes by, determine a location spaced the certain distance from a location at which an object in front of the autonomous vehicle 10 has stopped or is predicted to stop on the second candidate route as a second candidate stop location, and determine a location wanted by the driver or passenger on the second candidate route as a third candidate stop location.

Also, although not shown in FIG. 4B, the computing device 100 may determine a location which is spaced a certain distance from the stop line as a first candidate stop location for a third candidate route for changing lanes and traveling after another vehicle passes by, determine a location spaced the certain distance from a location at which the other vehicle (the vehicle having passed by) in front of the autonomous vehicle 10 has stopped or is predicted to stop on the third candidate route as a second candidate stop location, and determine a location wanted by the driver or passenger on the third candidate route as a third candidate stop location.

Here, the certain distance may be a value which is set in advance by the driver or passenger of the autonomous vehicle 10 or an operator of the computing device 100 or automatically calculated such that an event, such as collision, does not occur in the autonomous vehicle 10. However, the certain distance is not limited thereto, and various methods may be used to set the certain distance.

In operation S130, the computing device 100 may calculate scores for a plurality of candidate driving plans for the autonomous vehicle 10 to travel a plurality of candidate routes according to a preset speed profile.

Here, a process in which the autonomous vehicle 10 travels the plurality of candidate routes according to the preset speed profile may mean not only a process of continuously traveling the plurality of candidate routes according to the preset speed profile but also a process of traveling the plurality of candidate routes and then stopping at the candidate stop location determined on each of the plurality of candidate routes according to the preset speed profile. However, the process is not limited thereto.

In various embodiments, the computing device 100 may apply the preset speed profile (e.g., first to eighth speed profiles of FIGS. 6 to 13) to the autonomous vehicle 10 and calculate scores for the candidate driving plans (e.g., a case of traveling the candidate routes according to the preset speed profile or a case in which the autonomous vehicle 10 travels the candidate routes and then stops at the preset candidate stop locations) for the autonomous vehicle 10 to travel the candidate routes determined in operation S120 according to the preset speed profile.

In various embodiments, the computing device 100 may apply the preset speed profile to the autonomous vehicle 10. In other words, the computing device 100 may calculate a score for an operation (e.g., traveling or stopping) of the autonomous vehicle 10 according to the preset speed profile by applying the preset speed profile to each of the candidate stop locations according to whether the operation (e.g., traveling or stopping) of the autonomous vehicle 10 satisfies a plurality of preset conditions.

Here, the plurality of preset conditions may include, but not limited to, whether a collision is surely prevented, whether sudden deceleration or acceleration is prevented, whether a specific line is not crossed in consideration of traffic lights, yielding to another vehicle, etc., whether a sufficient margin to a definitely expected collision is ensured, whether a potentially anticipated risk is prevented, whether high speed is prevented for comfortable riding and safety in curve driving, whether the autonomous vehicle 10 complies with the speed limit, and whether the autonomous vehicle 10 maintains the speed limit of a road on which the autonomous vehicle 10 is traveling.

Also, a certain score may be given to each of the plurality of preset conditions, and the given score may be determined according to the priority of each condition. For example, the plurality of preset conditions may have decreasing priorities in the order listed above, and the condition with a high priority may have a higher score than the condition with a low priority (e.g., 20 points may be given to the condition of whether a collision is surely prevented, and 10 points may be given to the condition of whether the autonomous vehicle 10 complies with the speed limit).

Further, different scores may be given to the conditions according to how much the conditions are satisfied. For example, when 20 points are given to the condition of whether a collision is surely prevented, the degree of satisfaction is subdivided into five levels according to how reliably the collision is prevented (e.g., a first level indicating that a collision will occur, a second level indicating a high probability of collision, a third level indicating a medium probability of collision, a fourth level indicating a low probability of collision, and a fifth level of no probability of collision), and zero, five, ten, fifteen, and twenty points may be given to the subdivided levels.

In various embodiments, the computing device 100 may determine whether the candidate stop locations preset for the autonomous vehicle 10 correspond to preset no-stopping zones (e.g., locations set as a no-parking or stopping zone such as on a crosswalk, at an intersection, and close to a fire hydrant) and correct the scores calculated for the determined candidate stop locations according to the results of determining whether the candidate stop locations correspond to the preset no-stopping zones. For example, when a first candidate stop location corresponds to the no-stopping zones and a second candidate stop location does not correspond to the no-stopping zones, the computing device 100 may set scores such that the second candidate stop location is given a higher score than the first candidate stop location.

Here, the computing device 100 may consider a condition with a higher priority (e.g., the condition for collision prevention) rather than consider whether the candidate stop locations preset for the autonomous vehicle 10 correspond to the preset no-stopping zones and may not consider whether the candidate stop locations preset for the autonomous vehicle 10 correspond to the preset no-stopping zones or may set a relatively low score for whether the candidate stop locations preset for the autonomous vehicle 10 correspond to the preset no-stopping zones. However, a method of giving a score to a candidate stop location is not limited thereto.

Here, the preset no-stopping zone may be stored in map data (e.g., in the form of polygons) which is generated in advance for autonomous driving of the autonomous vehicle 10, and the computing device 100 may compare coordinate values of a candidate stop location of the autonomous vehicle 10 with coordinate values of the no-stopping zone in the map data and determine whether the autonomous vehicle 10 has stopped in the no-stopping zone when the autonomous vehicle 10 stops at the candidate stop location.

The above-described method of giving scores to a plurality of conditions and calculating a score by giving the scores when the conditions are satisfied is merely an example for describing a method of calculating a score. The method of calculating a score is not limited thereto, and various methods may be used to calculate a score for an operation of the autonomous vehicle 10 when the preset speed profile is applied.

In various embodiments, the computing device 100 may determine priorities for the candidate routes of the autonomous vehicle 10 according to a driving tendency or a driving style of the driver or passenger of the autonomous vehicle 10 or a request input in advance by the driver or passenger.

In general, all drivers have different driving styles, and thus drivers may prefer different methods even in the process of driving and stopping the vehicle. For example, some people prefer to minimize lane changes even when it takes more time to go to a preset destination, whereas other people may prefer to reach the destination in the shortest time regardless of route.

Even with regard to a method of stopping a vehicle at a specific location, some drivers prefer to stop a vehicle at a specific location by reducing a speed with a constant acceleration, whereas other drivers may prefer to rapidly reduce a speed of a vehicle to a certain speed, drive the vehicle to a specific location at a low speed, and then stop the vehicle.

To this end, the computing device 100 may receive such tendency information from the driver or passenger of the autonomous vehicle 10 in advance, set priorities for the candidate routes according to the received tendency information, and give weights to the candidate routes according to the priorities so that stop of the autonomous vehicle 10 may be possibly controlled in a way preferred by the driver or passenger.

Also, the computing device 100 may receive such tendency information from the driver or passenger of the autonomous vehicle 10 in advance, set priorities for speed profiles according to the received tendency information, and give weights to the speed profiles according to the priorities so that stop of the autonomous vehicle 10 may be possibly controlled in a way preferred by the driver or passenger. However, a method of controlling stop of the autonomous vehicle 10 is not limited thereto.

In various embodiments, the computing device 100 may calculate scores for candidate driving plans for driving along the candidate routes determined for the autonomous vehicle 10 using the processor 110 included therein. When there are a plurality of candidate driving plans whose scores will be calculated because there are a plurality of determined candidate routes or a plurality of candidate stop locations are determined on a determined candidate route, a plurality of different processors may be used to calculate scores for the plurality of candidate driving plans. For example, when candidate routes determined for the autonomous vehicle 10 are a first candidate route, a second candidate route, and a third candidate route, three processors, a first processor, a second processor, and a third processor, may be used to calculate scores for candidate driving plans for driving along the candidate routes.

Also, when a first candidate stop location, a second candidate stop location, and a third candidate stop location are determined on a first candidate route, the computing device 100 may calculate a score for each of a first candidate driving plan for traveling the first candidate route and then stopping at the first candidate stop location, a second candidate driving plan for traveling the first candidate route and then stopping at the second candidate stop location, and a third candidate driving plan for traveling the first candidate route and then stopping at the third candidate stop location using the three processors, the first processor, the second processor, and the third processor.

In various embodiments, the computing device 100 may set a plurality of processors to calculate scores for a preset number of candidate driving plans regardless of candidate routes and candidate stop locations.

In various embodiments, the computing device 100 may calculate scores for candidate driving plans (e.g., a candidate driving plan for traveling a plurality of candidate routes without stopping or a candidate driving plan for traveling to a candidate stop location on a plurality of candidate routes and a candidate stop location and then stopping) using one processor. When it is determined that the amount of processing exceeds a reference or the time required for completing a score calculation operation exceeds a reference due to a large number of targets (candidate driving plans) for which scores will be calculated, two or more processors may be operated to calculate scores for the plurality of candidate driving plans so that the time required for completing the process can be reduced. The preset speed profile which may be applied to various embodiments will be described below with reference to FIGS. 5 to 13.

Figure 5:
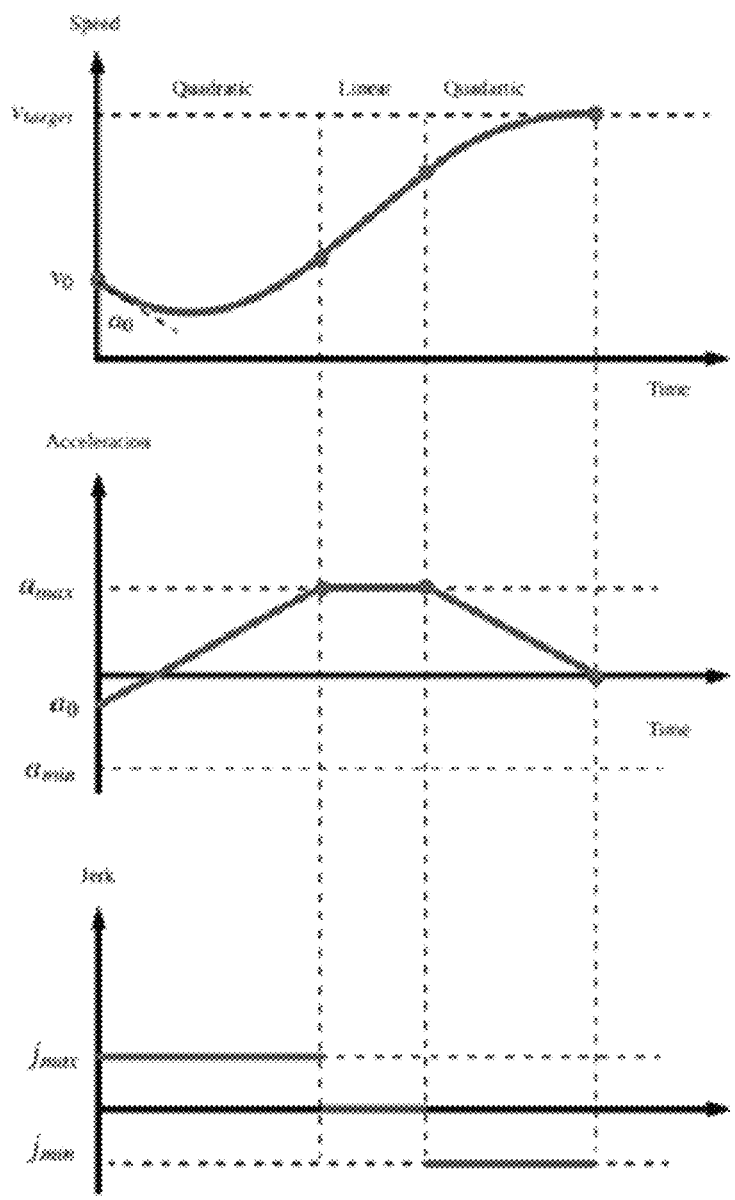
FIG. 5 is a set of graphs showing a sectional acceleration profile which may be applied to various embodiments.

FIG. 5 is a set of graphs showing a sectional acceleration profile which may be applied to various embodiments.

Referring to FIG. 5, in various embodiments, the computing device 100 may set a sectional acceleration profile according to a sectional linear acceleration method which may be applied to a plurality of speed profiles (e.g., FIGS. 6 to 13).

Here, the sectional acceleration profile may be set to increase or reduce a speed of the autonomous vehicle 10 from a current speed $v_0$ to a target speed $v_{target}$ when a current acceleration is $a_0$ such that the acceleration is changed from $a_0$ to zero when the speed becomes the target speed $v_{target}$ (e.g., the acceleration is set in a linear form and to become zero at a destination as shown in FIG. 5).

Here, a maximum acceleration $a_{max}$, a minimum acceleration $a_{min}$, a maximum positive (+) jerk (a vector for designating a rate of change of acceleration over time) $j_{max}$, and a maximum negative (−) jerk $j_{min}$ may be separately set in advance. However, the maximum acceleration $a_{max}$, the minimum acceleration $a_{min}$, the maximum positive (+) jerk $j_{max}$, and the maximum negative (−) jerk $j_{min}$ are not limited thereto.

In various embodiments, the acceleration of the autonomous vehicle 10 set according to the sectional acceleration profile may be set in consideration of all of the maximum acceleration $a_{max}$, the minimum acceleration $a_{min}$, the maximum positive (+) jerk $j_{max}$, and the maximum negative (−) jerk $j_{min}$.

As shown in FIG. 5, the acceleration of the autonomous vehicle 10 is increased to and maintained at the maximum acceleration $a_{max}$ for a certain time and then reduced to zero, but a change in acceleration is not limited thereto. In some cases, the acceleration of the autonomous vehicle 10 may be increased to the maximum acceleration $a_{max}$ and then immediately reduced to zero without being maintained for the certain time (e.g., in a triangle shape having a maximum value of $a_{max}$) or may be increased to a value smaller than $a_{max}$ and then immediately reduced to zero without being maintained for the certain time (e.g., in a triangle shape having a maximum value smaller than $a_{max}$).

Also, the acceleration of the autonomous vehicle 10 may be reduced to the minimum acceleration $a_{min}$ and then immediately increased to zero without being maintained for the certain time (e.g., in an inverted triangle shape having a minimum value of $a_{min}$) or may be reduced to a value smaller than $a_{min}$ and then immediately increase to zero without being maintained for the certain time (e.g., in an inverted triangle shape having a minimum value smaller than $a_{min}$). However, acceleration profiles are not limited thereto.

In various embodiments, the maximum acceleration $a_{max}$ and the minimum acceleration $a_{min}$ may be determined according to the maximum positive (+) jerk (a vector for designating a rate of change of acceleration over time) $j_{max}$ and the maximum negative (−) jerk $j_{min}$ which are set in advance. However, determinants of the maximum acceleration $a_{max}$ and the minimum acceleration $a_{min}$ are not limited thereto.

The range of acceleration determined by the maximum acceleration $a_{max}$ and the minimum acceleration $a_{min}$ may be set and changed without limitations. Preferably, the range of acceleration is set within a certain range (e.g., 1.5 m/s² to 2 m/s²) for comfortable riding of the driver or passenger of the autonomous vehicle 10.

In various embodiments, the computing device 100 may separately set values of $a_{max}$, $a_{min}$, $j_{max}$, and $j_{min}$ for each of the plurality of speed profiles (e.g., FIGS. 6 to 13) independently of other speed profiles. For example, to separately apply a sectional acceleration profile to the plurality of speed profiles, the computing device 100 may set values of $a_{max}$, $a_{min}$, $j_{max}$, and $j_{min}$ in the sectional acceleration profile applied to each of the plurality of speed profiles independently of other speed profiles. In this way, sectional acceleration profiles having the same values of $a_{max}$, $a_{min}$, $j_{max}$, and $j_{min}$ may be applied to the plurality of speed profiles, or sectional acceleration profiles having different values of $a_{max}$, $a_{min}$, $j_{max}$, and $j_{min}$ may be applied to the plurality of speed profiles.

Figure 6:
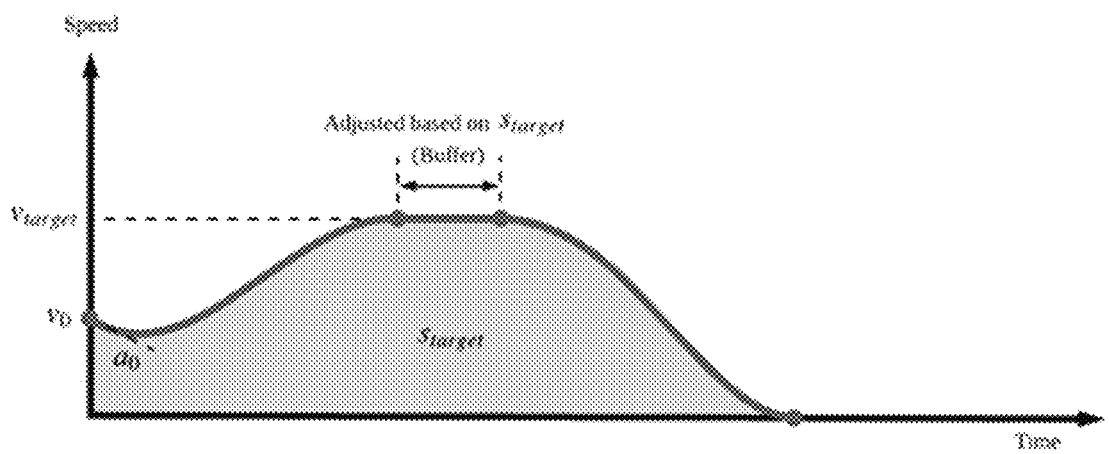
FIG. 6 is a graph showing a first speed profile (target location trapezoidal stop) which may be applied to various embodiments.

FIG. 6 is a graph showing a first speed profile (target location trapezoidal stop) which may be applied to various embodiments.

Referring to FIG. 6, in various embodiments, the computing device 100 may calculate a score for a candidate driving plan for the autonomous vehicle 10 to travel a candidate route and then stop at a determined candidate stop location according to the first speed profile by applying the first speed profile to the autonomous vehicle 10.

When a current speed of the autonomous vehicle 10 is $v_0$, a current acceleration is $a_0$, and a distance to the determined candidate stop location (target stop location) is $s_{target}$ (i.e., when values given for the autonomous vehicle 10 are $v_0$, $a_0$, and $s_{target}$), the first speed profile may increase or reduce the speed of the autonomous vehicle 10 from $v_0$ to a preset target speed $v_{target}$ (independent variable) using the current acceleration $a_0$ and a preset sectional acceleration profile (e.g., FIG. 5), maintain the speed of the autonomous vehicle 10 at $v_{target}$ for a certain period (Buffer) from a time point at which the speed of the autonomous vehicle 10 becomes $v_{target}$, and reduce the speed of the autonomous vehicle 10 from $v_{target}$ to zero and stop the autonomous vehicle 10 at the determined candidate stop location using the preset sectional acceleration profile after the certain period.

The certain period (Buffer) in the first speed profile may be automatically set so that a distance traveled by the autonomous vehicle 10 according to the first speed profile becomes $s_{target}$ which is the distance to the determined candidate stop location, but the certain period is not limited thereto.

In various embodiments, when $a_{max}$, $a_{min}$, $j_{max}$, and $j_{min}$ are not set to sufficiently large values according to the preset sectional acceleration profile, the certain period may not be set so that the distance traveled by the autonomous vehicle 10 according to the first speed profile becomes $s_{target}$ which is the distance to the determined candidate stop location. In this case, the computing device 100 may exclude a case in which the autonomous vehicle 10 travels and then stops at the determined candidate stop location according to the first speed profile from targets whose scores will be calculated.

In various embodiments, the computing device 100 may set the preset target speed $v_{target}$ to a plurality of different values and calculate scores for different cases in which a plurality of different target speeds $v_{target\_1}$, $v_{target\_2}$, and $v_{target\_3}$ (e.g., 30 km/h, 40 km/h, and 50 km/h) are set.

Figure 7:
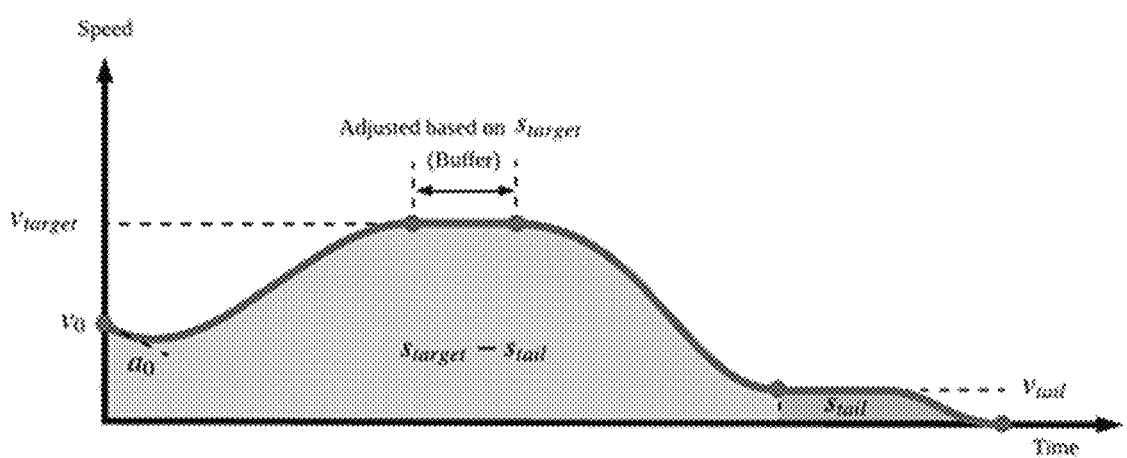
FIG. 7 is a graph showing a second speed profile (target location trapezoidal stop with tail) which may be applied to various embodiments.

FIG. 7 is a graph showing a second speed profile (target location trapezoidal stop with tail) which may be applied to various embodiments.

Referring to FIG. 7, in various embodiments, the computing device 100 may calculate a score for a candidate driving plan for the autonomous vehicle 10 to travel a candidate route and then stop at a determined candidate stop location according to the second speed profile by applying the second speed profile to the autonomous vehicle 10.

When a current speed of the autonomous vehicle 10 is $v_0$, a current acceleration is $a_0$, and a distance to the determined candidate stop location (target stop location) is $s_{target}$ (i.e., when values given for the autonomous vehicle 10 are $v_0$, $a_0$, and $s_{target}$), the second speed profile may increase or reduce the speed of the autonomous vehicle 10 from $v_0$ to a preset target speed $v_{target}$ (independent variable) using the current acceleration $a_0$ and a preset sectional acceleration profile (e.g., FIG. 5), maintain the speed of the autonomous vehicle 10 at $v_{target}$ for a first period (Buffer) from a time point at which the speed of the autonomous vehicle 10 becomes $v_{target}$, reduce the speed of the autonomous vehicle 10 from $v_{target}$ to a last target low speed immediately before stopping $v_{tail}$ (independent variable) using the preset sectional acceleration profile after the first period, maintain the speed of the autonomous vehicle 10 at $v_{tail}$ for a second period from a time point at which the speed of the autonomous vehicle 10 becomes $v_{tail}$, and reduce the speed of the autonomous vehicle 10 from $v_{tail}$ to zero and stop the autonomous vehicle 10 at the determined candidate stop location using the preset sectional acceleration profile after the second period.

The first period in the second speed profile may be set such that a distance traveled by the autonomous vehicle 10 according to the second speed profile becomes a difference between $s_{target}$ and $s_{tail}$ (independent variable), and the second period may be set such that a distance traveled by the autonomous vehicle 10 according to the second speed profile becomes $s_{tail}$. However, the first period and the second period are not limited thereto.

In various embodiments, when $a_{max}$, $a_{min}$, $j_{max}$, and $j_{min}$ are not set to sufficiently large values according to the preset sectional acceleration profile, the first period may not be set so that the distance traveled by the autonomous vehicle 10 according to the second speed profile becomes the difference between $s_{target}$ and $s_{tail}$, or the second period may not be set so that the distance traveled by the autonomous vehicle 10 according to the second speed profile becomes $s_{tail}$. In this case, the computing device 100 may exclude a case in which the autonomous vehicle 10 travels and then stops at the determined candidate stop location according to the second speed profile from targets whose scores will be calculated.

In various embodiments, the computing device 100 may set the preset target speed $v_{target}$ to a plurality of different values and calculate scores for different cases in which a plurality of target speeds $v_{target\_1}$, $v_{target\_2}$, and $v_{target\_3}$ (e.g., 30 km/h, 40 km/h, and 50 km/h) are set.

Also, the computing device 100 may set the last target low speed immediately before stopping $v_{tail}$ to a plurality of different values and calculate scores for different cases in which a plurality of target low speeds $v_{tail\_1}$, $v_{tail\_2}$, and $v_{tail\_3}$ (e.g., 3 km/h, 5 km/h, and 10 km/h) are set.

Further, the computing device 100 may set the distance $s_{tail}$ traveled by the autonomous vehicle 10 during the second period according to the second speed profile to a plurality of different values and calculate scores for different cases in which a plurality of distances traveled during the second period $s_{tail\_1}$, $s_{tail\_2}$, and $s_{tail\_3}$ (e.g., 3 m, 5 m, and 10 m) are set.

Figure 8:
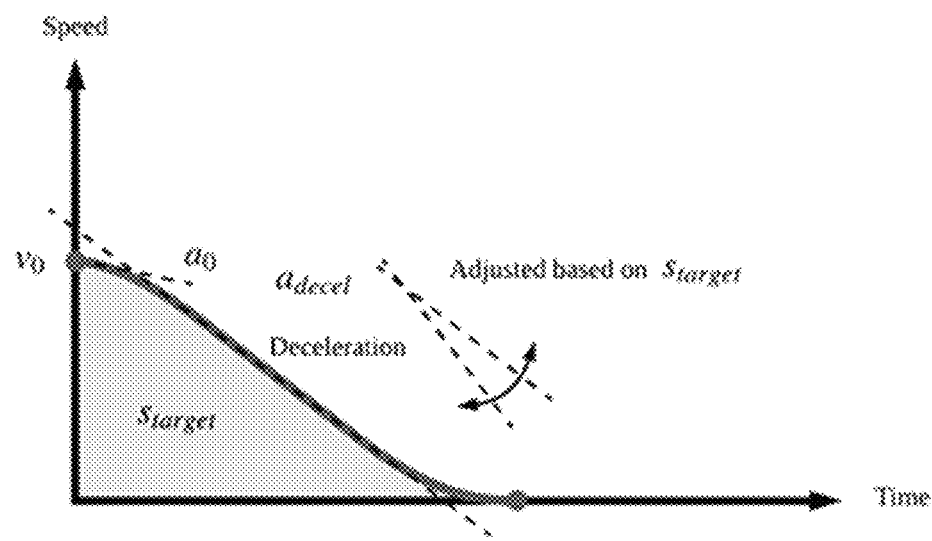
FIG. 8 is a graph showing a third speed profile (target location direct stop) which may be applied to various embodiments.

FIG. 8 is a graph showing a third speed profile (target location direct stop) which may be applied to various embodiments.

Referring to FIG. 8, in various embodiments, the computing device 100 may calculate a score for a candidate driving plan for the autonomous vehicle 10 to travel a candidate route and then stop at a determined candidate stop location according to the third speed profile by applying the third speed profile to the autonomous vehicle 10.

When a current speed of the autonomous vehicle 10 is $v_0$, a current acceleration is $a_0$, and a distance to the determined candidate stop location (target stop location) is $s_{target}$ (i.e., when values given for the autonomous vehicle 10 are $v_0$, $a_0$, and $s_{target}$), the third speed profile may reduce the speed of the autonomous vehicle 10 from $v_0$ to zero using the current acceleration $a_0$, a target acceleration $a_{decel}$ of the autonomous vehicle 10, and a preset sectional acceleration profile (e.g., FIG. 5) and stop the autonomous vehicle 10 at the determined candidate stop location using the preset sectional acceleration profile after the certain period.

$a_{decel}$ in the third speed profile may be a negative value such that the speed of the autonomous vehicle 10 is reduced and may be variably set such that a distance traveled by the autonomous vehicle 10 becomes $s_{target}$. However, $a_{decel}$ is not limited thereto.

In various embodiments, when $a_{max}$, $a_{min}$, $j_{max}$, and $j_{min}$ are not set to sufficiently large values according to the preset sectional acceleration profile, $a_{decel}$ may not be variably set so that the distance traveled by the autonomous vehicle 10 according to the third speed profile does not become $s_{target}$. In this case, the computing device 100 may exclude a case in which the autonomous vehicle 10 travels and then stops at the determined candidate stop location according to the third speed profile from targets whose scores will be calculated.

In various embodiments, the computing device 100 may determine $a_{decel}$ so that the distance traveled by the autonomous vehicle 10 according to the third speed profile becomes $s_{target}$, and in some cases (e.g., to satisfy a condition with a high priority such as whether a collision is prevented), $a_{decel}$ may be determined without considering the minimum acceleration $a_{min}$. However, a method of determining $a_{decel}$ is not limited thereto.

Figure 9:
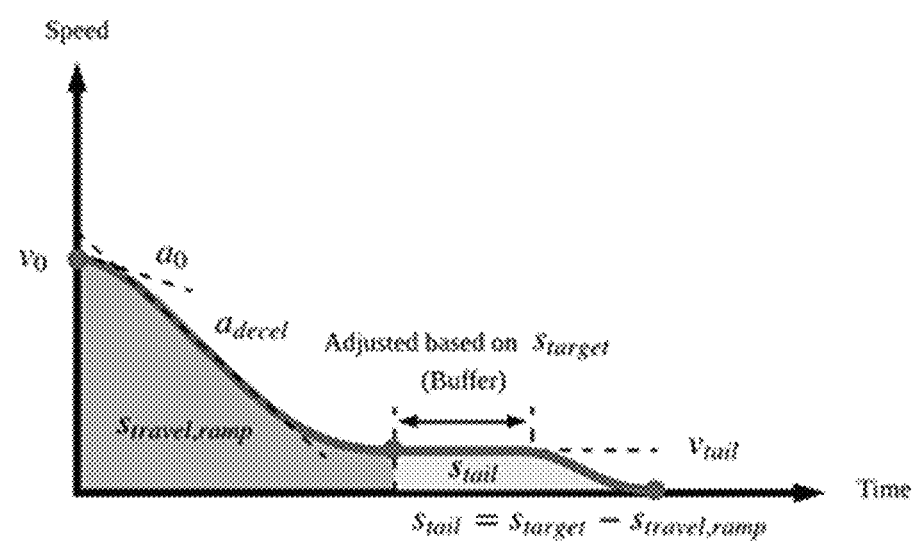
FIG. 9 is a graph showing a fourth speed profile (target location direct stop with tail) which may be applied to various embodiments.

FIG. 9 is a graph showing a fourth speed profile (target location direct stop with tail) which may be applied to various embodiments.

Referring to FIG. 9, in various embodiments, the computing device 100 may calculate a score for a candidate driving plan for the autonomous vehicle 10 to travel a candidate route and then stop at a determined candidate stop location according to the fourth speed profile by applying the fourth speed profile to the autonomous vehicle 10.

When a current speed of the autonomous vehicle 10 is $v_0$, a current acceleration is $a_0$, and a distance to the determined candidate stop location (target stop location) is $s_{target}$ (i.e., when values given for the autonomous vehicle 10 are $v_0$, $a_0$, and $s_{target}$), the fourth speed profile may reduce the speed of the autonomous vehicle 10 from $v_0$ to a last target low speed immediately before stopping $v_{tail}$ (independent variable) using the current acceleration $a_0$, a target acceleration $a_{decel}$ (independent variable) of the autonomous vehicle 10, and a preset sectional acceleration profile (e.g., FIG. 5), maintain the speed of the autonomous vehicle 10 at $v_{tail}$ for a certain period (Buffer) from a time point at which the speed of the autonomous vehicle 10 becomes $v_{tail}$, and reduce the speed of the autonomous vehicle 10 from $v_{tail}$ to zero and stop the autonomous vehicle 10 at the determined candidate stop location using the preset sectional acceleration profile after the certain period.

The certain period may be set such that a distance traveled by the autonomous vehicle 10 from a time point at which the speed of the autonomous vehicle 10 becomes a difference value $s_{tail}$ between $s_{target}$ and a distance $s_{travel,ramp}$ traveled by the autonomous vehicle 10 until the speed of the autonomous vehicle reaches $v_{tail}$. However, the certain period is not limited thereto.

In various embodiments, when $a_{max}$, $a_{min}$, $j_{max}$, and $j_{min}$ are not set to sufficiently large values according to the preset sectional acceleration profile, $a_{decel}$ may not be set so that a distance traveled by the autonomous vehicle 10 until the speed of the autonomous vehicle 10 reaches $v_{tail}$ becomes $s_{travel,ramp}$ or the certain period may not be set so that a distance traveled by the autonomous vehicle 10 from a time point at which the speed of the autonomous vehicle 10 becomes $v_{tail}$ becomes $s_{tail}$. In this case, the computing device 100 may exclude a case in which the autonomous vehicle 10 travels and then stops at the determined candidate stop location according to the fourth speed profile from targets whose scores will be calculated.

In various embodiments, the computing device 100 may set the last target low speed immediately before stopping $v_{tail}$ to a plurality of different values and calculate scores for different cases in which a plurality of target low speeds $v_{tail\_1}$, $v_{tail\_2}$, and $v_{tail\_3}$ (e.g., 3 km/h, 5 km/h, and 10 km/h) are set.

Also, the computing device 100 may set $a_{decel}$ to a plurality of different values so that the distance traveled by the autonomous vehicle 10 until the speed of the autonomous vehicle 10 reaches $v_{tail}$ becomes $s_{travel,ramp}$ and may calculate scores for different cases in which $a_{decel}$ is set to the plurality of acceleration values.

Figure 10:
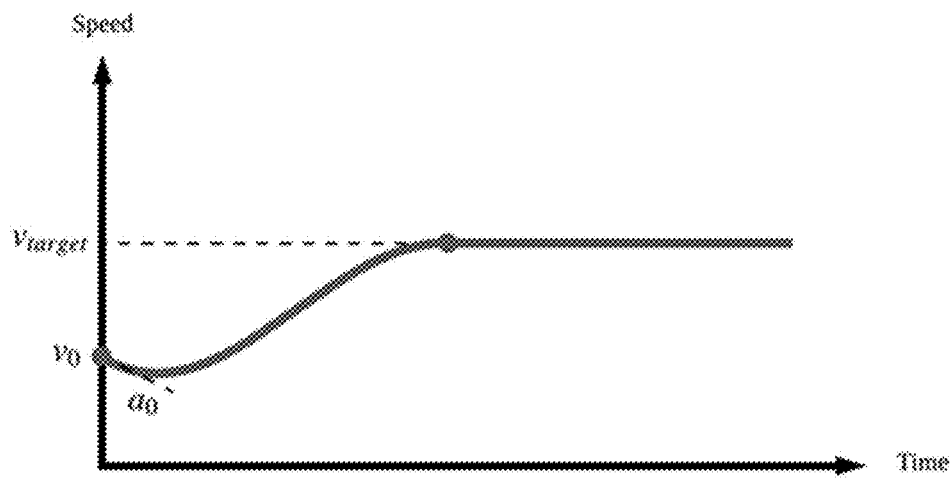
FIG. 10 is a graph showing a fifth speed profile (target speed achievement) which may be applied to various embodiments.

FIG. 10 is a graph showing a fifth speed profile (target speed achievement) which may be applied to various embodiments.

Referring to FIG. 10, in various embodiments, the computing device 100 may calculate a score for a candidate driving plan for the autonomous vehicle 10 to travel a candidate route according to the fifth speed profile by applying the fifth speed profile to the autonomous vehicle 10.

When a current speed of the autonomous vehicle 10 is $v_0$ and a current acceleration is $a_0$ (i.e., when values given for the autonomous vehicle 10 are $v_0$ and $a_0$), the fifth speed profile may increase or reduce the speed of the autonomous vehicle 10 from $v_0$ to a target speed $v_{target}$ (independent variable) using the current acceleration $a_0$ and a preset sectional acceleration profile (e.g., FIG. 5) and cause the autonomous vehicle 10 to travel while maintaining the speed of the autonomous vehicle at $v_{target}$. However, the fifth speed profile is not limited thereto.

In various embodiments, the computing device 100 may set the preset target speed $v_{target}$ to a plurality of different values and calculate scores for different cases in which a plurality of different target speeds $v_{target\_1}$, $v_{target\_2}$, and $v_{target\_3}$ (e.g., 30 km/h, 40 km/h, and 50 km/h) are set.

Figure 11:
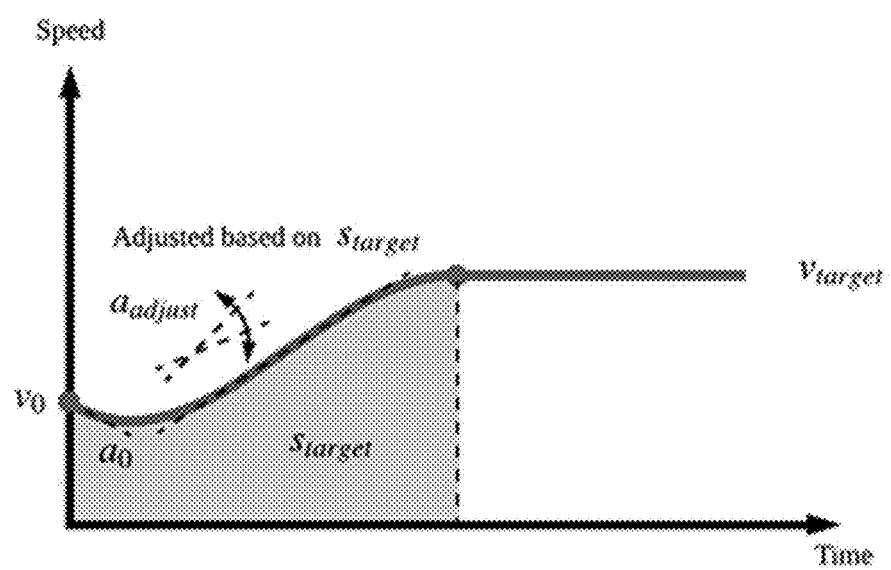
FIG. 11 is a graph showing a sixth speed profile (target location target speed achievement) which may be applied to various embodiments.

FIG. 11 is a graph showing a sixth speed profile (target location target speed achievement) which may be applied to various embodiments.

Referring to FIG. 11, in various embodiments, the computing device 100 may calculate a score for a candidate driving plan for the autonomous vehicle 10 to travel a candidate route according to the sixth speed profile by applying the sixth speed profile to the autonomous vehicle 10.

When a current speed of the autonomous vehicle 10 is $v_0$, a current acceleration is $a_0$, and a distance to a location at which a target speed $v_{target}$ (independent variable) of the autonomous vehicle 10 will be achieved is $s_{target}$ (i.e., when values given for the autonomous vehicle 10 are $v_0$, $a_0$, and $s_{target}$), the sixth speed profile may increase or reduce the speed of the autonomous vehicle 10 from $v_0$ to $v_{target}$ using the current acceleration $a_0$, a target acceleration $a_{adjust}$ of the autonomous vehicle 10, and a preset sectional acceleration profile (e.g., FIG. 5) and cause the autonomous vehicle 10 to travel while maintaining the speed of the autonomous vehicle at $v_{target}$.

$a_{adjust}$ in the sixth speed profile may be set such that a distance traveled by the autonomous vehicle 10 until the speed of the autonomous vehicle 10 reaches $v_{target}$ becomes $s_{target}$. However, $a_{adjust}$ is not limited thereto.

In various embodiments, when $a_{max}$, $a_{min}$, $j_{max}$, and $j_{min}$ are not set to sufficiently large values according to the preset sectional acceleration profile, $a_{adjust}$ may not be set so that the distance traveled by the autonomous vehicle 10 until the speed of the autonomous vehicle 10 reaches $v_{target}$ become $s_{target}$. In this case, the computing device 100 may exclude a case in which the autonomous vehicle 10 travels and then stops at a determined candidate stop location according to the sixth speed profile from targets whose scores will be calculated.

In various embodiments, the computing device 100 may set the preset target speed $v_{target}$ to a plurality of different values and calculate scores for different cases in which a plurality of different target speeds $v_{target\_1}$, $v_{target\_2}$, and $v_{target\_3}$ (e.g., 30 km/h, 40 km/h, and 50 km/h) are set.

Figure 12:
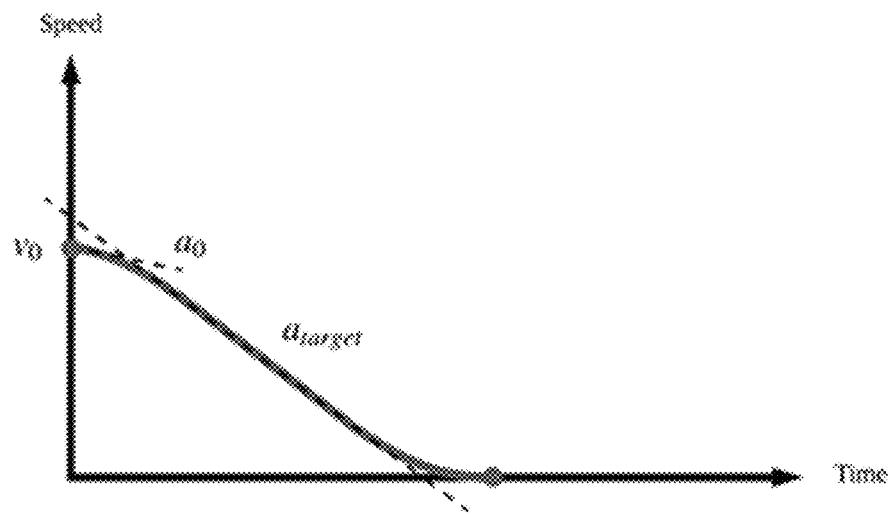
FIG. 12 is a graph showing a seventh speed profile (smooth stop) which may be applied to various embodiments.

FIG. 12 is a graph showing a seventh speed profile (smooth stop) which may be applied to various embodiments.

Referring to FIG. 12, in various embodiments, the computing device 100 may calculate a score for a candidate driving plan for the autonomous vehicle 10 to travel a candidate route and stop according to the seventh speed profile by applying the seventh speed profile to the autonomous vehicle 10.

When a current speed of the autonomous vehicle 10 is $v_0$ and a current acceleration is $a_0$ (i.e., when values given for the autonomous vehicle 10 are $v_0$ and $a_0$), the seventh speed profile may reduce the speed of the autonomous vehicle 10 from $v_0$ to zero and stop the autonomous vehicle 10 using the current acceleration $a_0$, a target acceleration $a_{target}$ (independent variable) of the autonomous vehicle 10, and a preset sectional acceleration profile (e.g., FIG. 5).

Unlike the third speed profile, the seventh speed profile may simply stop the autonomous vehicle 10 by reducing the speed using the target acceleration $a_{target}$ having a negative (−) value regardless of a determined candidate stop location. However, the seventh speed profile is not limited thereto.

In various embodiments, the computing device 100 may set the target acceleration $a_{target}$ to a plurality of different values and calculate scores for different cases in which a plurality of different target accelerations $a_{target\_1}$, $a_{target\_2}$, and $a_{target\_3}$ (e.g., −1 m/s$^2$, −2 m/s$^2$, and −3 m/s$^2$) are set.

Figure 13:
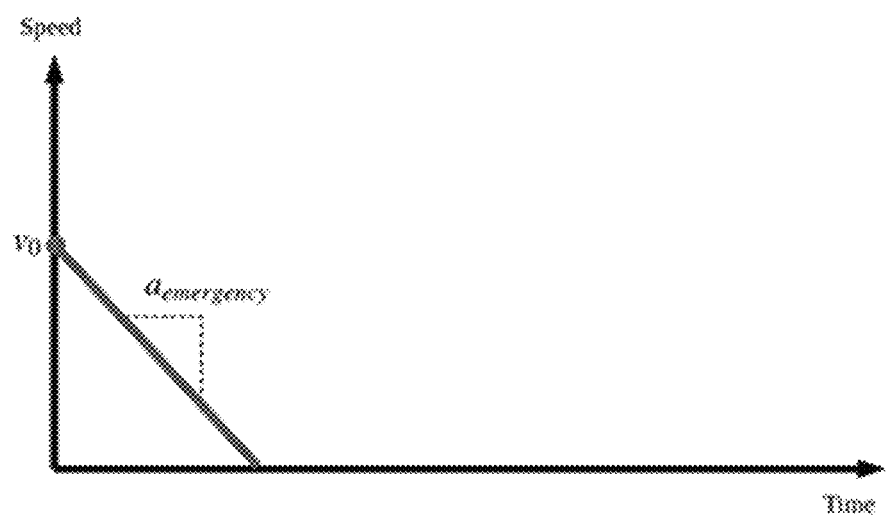
FIG. 13 is a graph showing an eighth speed profile (emergency stop) which may be applied to various embodiments.

FIG. 13 is a graph showing an eighth speed profile (emergency stop) which may be applied to various embodiments.

Referring to FIG. 13, in various embodiments, the computing device 100 may calculate a score for a candidate driving plan for the autonomous vehicle 10 to travel a candidate route and stop according to the eighth speed profile by applying the eighth speed profile to the autonomous vehicle 10.

When a current speed of the autonomous vehicle 10 is $v_0$ (i.e., when a value given for the autonomous vehicle 10 is $v_0$), the eighth speed profile may reduce the speed of the autonomous vehicle 10 from $v_0$ to zero and stop the autonomous vehicle 10 using a preset acceleration $a_{emergency}$.

$a_{emergency}$ in the eighth speed profile may be a value preset without considering a current acceleration $a_0$ of the autonomous vehicle 10 and a preset sectional acceleration profile (e.g., FIG. 5).

It has been described above that the computing device 100 calculates a candidate stop location and a score for a driving plan to the candidate stop location by applying the first speed profile to the eighth speed profile (e.g., FIGS. 6 to 13). However, speed profiles are not limited thereto, and various speed profiles may be used in addition to the above-described speed profiles in consideration of a driving tendency of the driver and the like.

Referring back to FIG. 3, in operation S140, the computing device 100 may finalize a driving plan for the autonomous vehicle 10 on the basis of the scores calculated for the plurality of candidate driving plans.

The scores calculated for the plurality of candidate driving plans may not only be scores for evaluating how appropriate it is for the autonomous vehicle 10 to travel each candidate route without stopping or how appropriate it is for the autonomous vehicle 10 to travel each candidate route and then stop at a predetermined candidate stop location but also scores for evaluating whether the predetermined candidate stop location is appropriate for stopping.

Figure 14:
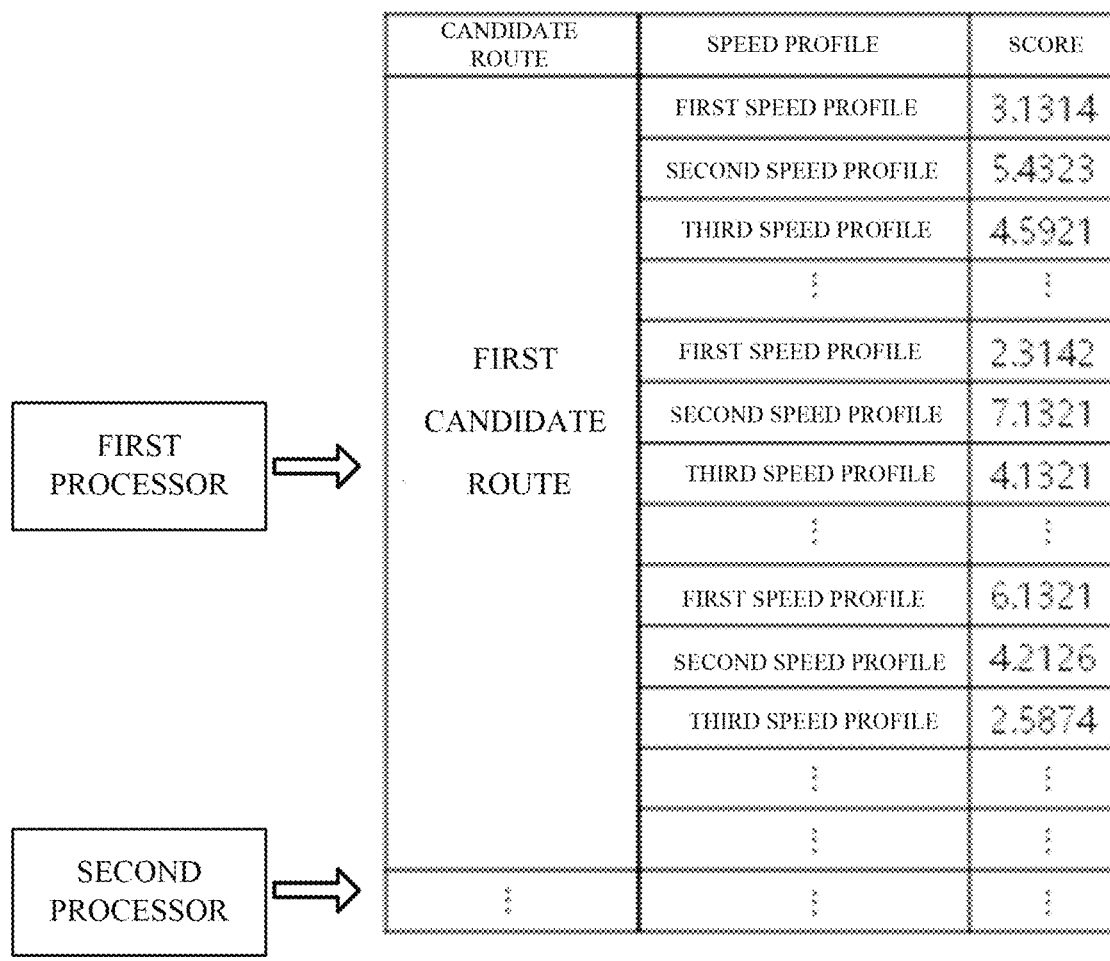
FIG. 14 is a table exemplifying scores calculated by a device for controlling stop of an autonomous vehicle using a speed profile according to various embodiments.

Therefore, the computing device 100 may finalize a stop location for the autonomous vehicle 10 on the basis of the calculated scores and finalize a driving plan including a driving method (e.g., a speed profile), which represents how to travel and stop at the finalized location, at the same time. For example, when a candidate route and a speed profile with the calculated highest scores are the first candidate route and the second speed profile as shown in FIG. 14, the computing device 100 may finalize a driving plan for the autonomous vehicle 10 to travel to a candidate stop location on the first candidate route and stop at the candidate stop location according to the second speed profile.

In various embodiments, when scores for the plurality of candidate driving plans are calculated using a plurality of different processors, the computing device 100 may collect the scores for the plurality of candidate driving plans calculated by the plurality of different processors, select the candidate driving plan with the highest score by comparing the collected scores for the plurality of candidate driving plans, and finalize a driving plan representing a route and a stop location of the autonomous vehicle 10 and a driving method (e.g., a speed profile) to the stop location using the selected candidate driving plan.

In various embodiments, when the candidate driving plan with the highest score is a driving plan for continuously traveling without stopping, the computing device 100 may not finalize a stop location or may determine that a stop location does "not exist."

Subsequently, the computing device 100 may determine a control command for controlling the autonomous vehicle 10 according to the finalized driving plan including the stop location of the autonomous vehicle 10 and the driving method to the stop location and provide the determined control command to the autonomous vehicle 10 (or the control module provided in the autonomous vehicle 10).

In various embodiments, the computing device 100 may provide information on the finalized driving plan including the stop location of the autonomous vehicle 10 and the driving method to the stop location to an external autonomous vehicle control server, receive a control command from the autonomous vehicle control server in response to the information on the finalized driving plan including the stop location of the autonomous vehicle 10 and the driving method to the stop location, and transmit the received control command to the autonomous vehicle 10 (or the control module provided in the autonomous vehicle 10).

In various embodiments, the computing device 100 may receive a target stop location of the autonomous vehicle 10 from the user (e.g., receives the target stop location from the driver or passenger through the user terminal 200 separately provided in the autonomous vehicle 10), transmit information on the received target stop location to a server (e.g., an office or situation room server for remotely controlling the autonomous vehicle 10), and obtain a control command from the server.

After scores are calculated for the target stop location and the driving plan including the target stop location and the driving method to the target stop location on the basis of a preset speed profile, the control command may be determined according to the calculated scores.

Subsequently, the computing device 100 may control the autonomous vehicle 10 according to the driving plan such that the autonomous vehicle 10 may stop at the target stop location according to the control command or may provide the control command to the autonomous vehicle 10 (or the control module provided in the autonomous vehicle 10) such that the autonomous vehicle 10 may be controlled.

In various embodiments, the computing device 100 may provide guide information of the driving plan finalized through the above procedure. For example, the computing device 100 may provide information on the driving plan including information on the finalized route, the finalized stop location, and the finalized driving method through a display provided in the autonomous vehicle 10 such that the driver or passenger of the autonomous vehicle 10 may be aware of the finalized stop location and how to drive to the finalized stop location.

Also, the computing device 100 may provide information on the driving plan including the finalized route, the stop location, and the driving method to the stop location to another vehicle adjacent to the autonomous vehicle 10 through vehicle-to-vehicle communication and thereby prevent a driver or passenger of the other vehicle adjacent to the autonomous vehicle 10 from suffering from inconvenience or prevent the occurrence of a dangerous situation.

In addition, the computing device 100 may display the finalized stop location on a road on which the autonomous vehicle 10 is traveling through a location display module (e.g., a laser pointer) provided in the autonomous vehicle 10 and thereby providing a guide such that the driver or passenger of the other vehicle adjacent to the autonomous vehicle 10 may recognize where the autonomous vehicle 10 will stop. However, a method of providing the guide to the stop location is not limited thereto.

In various embodiments, the computing device 100 may control the autonomous vehicle 10 according to a driving plan including a finalized route, stop location, and driving method to the stop location. In other words, the computing device 100 may repeatedly perform a process (operation S110 to operation S140) of setting a driving plan including a route, a stop location, and a driving method to the stop location for the autonomous vehicle 10 every time the location of the autonomous vehicle 10 is changed by a certain distance or every certain time (e.g., 50 ms) and continuously update a driving plan including a finalized route, stop location, and driving method to the stop location on the basis of a result of the process. In this way, even in a road environment in which surroundings rapidly change, it is possible to set an optimized route, a stop location, and a driving method to the stop location.

According to various embodiments of the present invention, a stop location of an autonomous vehicle is determined in consideration of surrounding information of the autonomous vehicle. Here, scores for a plurality of candidate routes and candidate stop locations on the plurality of candidate routes are calculated using a plurality of preset speed profiles, and a stop location of the autonomous vehicle is determined on the basis of the calculated scores. Accordingly, it is possible to determine an optimal stop location at which the autonomous vehicle will stop.

Effects of the present invention are not limited to that described above, and other effects which have not been described above will be clearly understood by those of ordinary skill in the art from the detailed description.

The method of controlling stop of an autonomous vehicle using a speed profile has been described above with reference to the flowchart shown in the drawing. For brief description, the method of controlling stop of an autonomous vehicle using a speed profile has been illustrated in a series of blocks. However, the present invention is not limited to the sequence of the blocks, and some blocks may be performed at the same time or in a different order than that described herein. Also, a new block which has not been described herein or illustrated in the drawing may be added, or some blocks may be omitted or changed.

Although the exemplary embodiments of the present invention have been described with reference to the accompanying drawings, those skilled in the technical field to which the present invention pertains will appreciate that the present invention may be embodied in other specific forms without changing the technical spirit or essential characteristics thereof. Therefore, the above-described embodiments are to be construed as illustrative and not restrictive in all aspects.

What is claimed is:

1. A method of controlling, by a computing device, stop of an autonomous vehicle using a speed profile, the method comprising:

obtaining surrounding information of an autonomous vehicle;

determining candidate routes for controlling stop of the autonomous vehicle on the basis of the surrounding information;

calculating scores for candidate driving plans for the autonomous vehicle to travel the determined candidate routes according to a preset speed profile; and finalizing a driving plan for the autonomous vehicle on the basis of the calculated scores.

2. The method of claim 1, wherein the calculating of the scores comprises calculating the score for the candidate driving plan for the autonomous vehicle to travel the determined candidate route and then stop at the determined candidate stop location according to a first speed profile by applying the first speed profile to the autonomous vehicle, wherein, when a current speed of the autonomous vehicle is $v_0$, a current acceleration is $a_0$, and a distance to the determined candidate stop location is $s_{target}$, the first speed profile increases or reduces a speed of the autonomous vehicle from $v_0$ to a preset target speed of $v_{target}$ using the current acceleration of $a_0$ and a preset sectional acceleration profile, maintains the speed of the autonomous vehicle at $v_{target}$ for a certain period from a time point at which the speed of the autonomous vehicle becomes $v_{target}$, and reduces the speed of the autonomous vehicle from $v_{target}$ to zero using the preset sectional acceleration profile and stops the autonomous vehicle at the determined candidate stop location after the certain period, and wherein the certain period is set such that a distance traveled by the autonomous vehicle according to the first speed profile becomes $s_{target}$.

3. The method of claim 1, wherein the calculating of the scores comprises calculating the score for the candidate driving plan for the autonomous vehicle to travel the determined candidate route and then stop at the determined candidate stop location according to a second speed profile by applying the second speed profile to the autonomous vehicle, wherein, when a current speed of the autonomous vehicle is $v_0$, a current acceleration is $a_0$, and a distance to the determined candidate stop location is $s_{target}$, the second speed profile increases or reduces a speed of the autonomous vehicle from $v_0$ to a preset target speed of $v_{target}$ using the current acceleration of $a_0$ and a preset sectional acceleration profile, maintains the speed of the autonomous vehicle at $v_{target}$ for a first period from a time point at which the speed of the autonomous vehicle becomes $v_{target}$, reduces the speed of the autonomous vehicle from $v_{target}$ to $v_{tail}$ using the preset sectional acceleration profile after the first period, maintains the speed of the autonomous vehicle at $v_{tail}$ for a second period from a time at which the speed of the autonomous vehicle becomes $v_{tail}$, and reduces the speed of the autonomous vehicle from $v_{tail}$ to zero using the preset sectional acceleration profile and stops the autonomous vehicle at the determined candidate stop location after the second period, wherein the first period is set such that a distance traveled by the autonomous vehicle according to the second speed profile becomes a difference between $s_{target}$ and $s_{tail}$, and the second period is set such that a distance traveled by the autonomous vehicle according to the second speed profile becomes $s_{tail}$.

4. The method of claim 1, wherein the calculating of the scores comprises calculating the score for the candidate driving plan for the autonomous vehicle to travel the determined candidate route and then stop at the determined candidate stop location according to a third speed profile by applying the third speed profile to the autonomous vehicle, wherein, when a current speed of the autonomous vehicle is $v_0$, a current acceleration is $a_0$, a distance to the determined candidate stop location is $s_{target}$, the third speed profile reduces a speed of the autonomous vehicle from $v_0$ to zero using the current acceleration of $a_0$, a target acceleration of $a_{decel}$ of the autonomous vehicle, and a preset sectional acceleration profile and stops the autonomous vehicle at the determined candidate stop location, and wherein $a_{decel}$ is set to a value such that a distance traveled by the autonomous vehicle according to the third speed profile becomes $s_{target}$.

5. The method of claim 1, wherein the calculating of the scores comprises calculating the score for the candidate driving plan for the autonomous vehicle to travel the determined candidate route and then stop at the determined candidate stop location according to a fourth speed profile by applying the fourth speed profile to the autonomous vehicle, wherein, when a current speed of the autonomous vehicle is $v_0$, a current acceleration is $a_0$, and a distance to the determined candidate stop location is $s_{target}$, the fourth speed profile reduces a speed of the autonomous vehicle from $v_0$ to $v_{tail}$ using the current acceleration of $a_0$, a target acceleration of $a_{decel}$ of the autonomous vehicle, and a preset sectional acceleration profile, maintains the speed of the autonomous vehicle at $v_{tail}$ for a certain period from a time point at which the speed of the autonomous vehicle becomes $v_{tail}$, and reduces the speed of the autonomous vehicle from $v_{tail}$ to zero using the preset sectional acceleration profile and stops the autonomous vehicle at the determined candidate stop location after the certain period, and wherein the certain period is set such that a distance traveled by the autonomous vehicle from the time point at which the speed of the autonomous vehicle becomes $v_{tail}$ becomes a difference value $s_{tail}$ between $s_{target}$ and a distance $s_{travel,ramp}$ traveled by the autonomous vehicle until the speed of the autonomous vehicle reaches $v_{tail}$.

6. The method of claim 1, wherein the calculating of the scores comprises calculating the score for the candidate driving plan for the autonomous vehicle to travel the determined candidate route according to a fifth speed profile by applying the fifth speed profile to the autonomous vehicle, wherein, when a current speed of the autonomous vehicle is $v_0$ and a current acceleration is $a_0$, the fifth speed profile increases or reduces a speed of the autonomous vehicle from $v_0$ to $v_{target}$ using the current acceleration of $a_0$ and a preset sectional acceleration profile and causes the autonomous vehicle to travel while maintaining the speed of the autonomous vehicle at $v_{target}$.

7. The method of claim 1, wherein the calculating of the scores comprises calculating the score for the candidate driving plan for the autonomous vehicle to travel the determined candidate route according to a sixth speed profile by applying the sixth speed profile to the autonomous vehicle, wherein, when a current speed of the autonomous vehicle is $v_0$, a current acceleration is $a_0$, and a distance to a location at which a preset target speed of $v_{target}$ of the autonomous vehicle will be achieved is $s_{target}$, the sixth speed profile increases or reduces a speed of the autonomous vehicle from $v_0$ to $v_{target}$ using the current acceleration of $a_0$, a target acceleration of $a_{adjust}$ of the autonomous vehicle, and a preset sectional acceleration profile and causes the autonomous vehicle to travel while maintaining the speed of the autonomous vehicle at $v_{target}$, and $a_{adjust}$ is set such that a distance traveled by the autonomous vehicle until the speed of the autonomous vehicle reaches $v_{target}$ becomes $s_{target}$.

8. The method of claim 1, wherein the calculating of the scores comprises calculating the score for the candidate driving plan for the autonomous vehicle to travel the determined candidate route and stop according to a seventh speed profile by applying the seventh speed profile to the autonomous vehicle, wherein, when a current speed of the autonomous vehicle is $v_0$ and a current acceleration is $a_0$, the seventh speed profile reduces a speed of the autonomous vehicle from $v_0$ to zero and stops the autonomous vehicle using the current acceleration of $a_0$, a target acceleration of $a_{target}$ of the autonomous vehicle, and a preset sectional acceleration profile.

9. The method of claim 1, wherein the calculating of the scores comprises calculating the score for the candidate driving plan for the autonomous vehicle to travel the determined candidate route and stop according to an eighth speed profile by applying the eighth speed profile to the autonomous vehicle, wherein, when a current speed of the autonomous vehicle is $v_0$, the eighth speed profile reduces a speed of the autonomous vehicle from $v_0$ to zero and stops the autonomous vehicle using a preset acceleration of $a_{emergency}$, and $a_{emergency}$ is a value preset without considering a current acceleration of $a_0$ of the autonomous vehicle and a preset sectional acceleration profile.

10. The method of claim 1, wherein the calculating of the scores comprises determining whether the determined candidate stop locations correspond to a preset no-stopping zone and correcting the scores calculated for the determined candidate stop locations according to a result of determining whether the determined candidate stop locations correspond to the preset no-stopping zone.

11. The method of claim 1, wherein the calculating of the scores comprises calculating the scores for the candidate driving plans for traveling the determined candidate routes using a processor included in the computing device, when there are a plurality of candidate driving plans for which scores will be calculated because there are the plurality of determined candidate routes or the plurality of candidate stop locations are determined on the determined candidate routes, the calculating of the scores comprises calculating the scores for the plurality of candidate driving plans for traveling the determined candidate routes using a plurality of different processors included in the computing device, the plurality of candidate driving plans including continuously traveling the plurality of candidate routes without stopping or traveling the plurality of candidate routes and then stopping at any one of the plurality of candidate stop locations determined on the plurality of candidate routes, and the finalizing of the driving plan comprises collecting the scores calculated by the plurality of different processors and finalizing the candidate driving plan having the highest score as the driving plan for the autonomous vehicle.

12. The method of claim 1, further comprising:

receiving a target stop location for the autonomous vehicle from a user;

transmitting information on the received target stop location to a server and receiving a control command, which is determined according to scores calculated for the target stop location and a driving plan including a driving method to the target stop location on the basis of the preset speed profile, from the server; and controlling the autonomous vehicle to stop at the target stop location according to the control command.

13. The method of claim 1, further comprising providing guide information of the finalized stop location, wherein the providing of the guide information comprises providing information on the finalized route, the finalized stop location, and the finalized driving plan through a display provided in the autonomous vehicle, providing the information on the finalized route, the finalized stop location, and the finalized driving plan to another vehicle adjacent to the autonomous vehicle through vehicle-to-vehicle communication, or displaying the finalized stop location on a road on which the autonomous vehicle is traveling through a location display module provided in the autonomous vehicle.

14. A device for controlling stop of an autonomous vehicle using a speed profile, the device comprising:

a processor;

a network interface;

a memory; and a computer program which is loaded into the memory and executed by the processor, wherein the computer program comprises;

an instruction of obtaining surrounding information of an autonomous vehicle;

an instruction of determining candidate routes for controlling stop of the autonomous vehicle on the basis of the surrounding information;

an instruction of calculating scores for candidate driving plans for the autonomous vehicle to travel the determined candidate routes according to a preset speed profile;

an instruction of finalizing a driving plan for the autonomous vehicle on the basis of the calculated scores; and an instruction of determining candidate stop locations on the determined candidate routes, wherein the determining of the candidate stop locations comprises determining, as a candidate stop location, at least one of a location which is spaced a certain distance from a stop line on the determined candidate route, a location which is spaced a certain distance from a location at which an object present on the determined candidate route has stopped or is predicted to stop, and a location input by a driver or a passenger of the autonomous vehicle, the calculating of the scores comprises calculating scores for the determined candidate stop locations and the candidate driving plans including driving methods to the determined candidate stop locations, and the finalizing of the driving plan comprises finalizing a route, a stop location, and a driving plan including a driving method to the stop location for the autonomous vehicle on the basis of the calculated score.

15. A non-transitory computer-readable recording medium storing a computer program, and configured to be coupled to a computer hardware, the program includes instructions to execute operations of:

obtaining surrounding information of an autonomous vehicle;
determining candidate routes for controlling stop of the autonomous vehicle on the basis of the surrounding information;
calculating scores for candidate driving plans for the autonomous vehicle to travel the determined candidate routes according to a preset speed profile;
finalizing a driving plan for the autonomous vehicle on the basis of the calculated scores; and
determining candidate stop locations on the determined candidate routes,
wherein the determining of the candidate stop locations comprises determining, as a candidate stop location, at least one of a location which is spaced a certain distance from a stop line on the determined candidate route, a location which is spaced a certain distance from a location at which an object present on the determined candidate route has stopped or is predicted to stop, and a location input by a driver or a passenger of the autonomous vehicle,
the calculating of the scores comprises calculating scores for the determined candidate stop locations and the candidate driving plans including driving methods to the determined candidate stop locations, and
the finalizing of the driving plan comprises finalizing a route, a stop location, and a driving plan including a driving method to the stop location for the autonomous vehicle on the basis of the calculated score.

* * * * *